US008909551B2

(12) United States Patent
Pawlusiak et al.

(10) Patent No.: US 8,909,551 B2
(45) Date of Patent: Dec. 9, 2014

(54) SYSTEM AND METHOD OF EXPEDITED CREDIT AND LOAN PROCESSING

(71) Applicants: Paul Pawlusiak, Wixom, MI (US); David Lohoefer, Wixom, MI (US)

(72) Inventors: Paul Pawlusiak, Wixom, MI (US); David Lohoefer, Wixom, MI (US)

( * ) Notice: Subject to any disclaimer, the term of this patent is extended or adjusted under 35 U.S.C. 154(b) by 0 days.

(21) Appl. No.: 13/839,901

(22) Filed: Mar. 15, 2013

(65) Prior Publication Data

US 2013/0218752 A1    Aug. 22, 2013

Related U.S. Application Data

(63) Continuation-in-part of application No. 13/625,796, filed on Sep. 24, 2012, application No. 13/839,901, which is a continuation-in-part of application No. PCT/US2012/056949, filed on Sep. 24, 2012.

(60) Provisional application No. 61/537,757, filed on Sep. 22, 2011, provisional application No. 61/537,757, filed on Sep. 22, 2011.

(51) Int. Cl.
*G06Q 40/00* (2012.01)
*G06Q 40/02* (2012.01)

(52) U.S. Cl.
CPC .............. *G06Q 40/025* (2013.01); *G06Q 40/02* (2013.01)
USPC ................................................ 705/38; 705/35

(58) Field of Classification Search
None
See application file for complete search history.

(56) References Cited

U.S. PATENT DOCUMENTS

| | | | | |
|---|---|---|---|---|
| 3,083,641 A * | 4/1963 | Childs et al. | ................... | 101/269 |
| 3,896,266 A * | 7/1975 | Waterbury | ............... | 379/114.19 |
| 4,023,013 A * | 5/1977 | Kinker | ........................... | 235/379 |
| 5,010,485 A * | 4/1991 | Bigari | .............................. | 705/17 |
| 5,280,521 A * | 1/1994 | Itoh | ................................ | 455/403 |
| 5,357,563 A * | 10/1994 | Hamilton et al. | ........... | 379/91.01 |
| 5,428,210 A * | 6/1995 | Nair et al. | ...................... | 235/375 |
| 5,432,326 A * | 7/1995 | Noblett et al. | ................ | 235/380 |
| 5,615,109 A * | 3/1997 | Eder | ........................... | 705/7.12 |
| 5,749,077 A * | 5/1998 | Campbell | .................... | 705/36 R |
| 5,909,542 A * | 6/1999 | Paquette et al. | ................ | 709/203 |
| 6,112,190 A * | 8/2000 | Fletcher et al. | ............. | 705/36 R |
| 6,366,892 B1 * | 4/2002 | Altman et al. | ................... | 705/38 |
| 6,811,082 B2 * | 11/2004 | Wong | ............................ | 235/451 |
| 7,398,238 B1 * | 7/2008 | Calce et al. | ..................... | 705/35 |
| 7,409,361 B2 * | 8/2008 | Dinwoodie | ................... | 705/26.3 |
| 7,419,094 B2 * | 9/2008 | Grear et al. | .................... | 235/380 |
| 7,555,443 B2 * | 6/2009 | Chandran et al. | ............ | 705/7.29 |
| 7,610,257 B1 * | 10/2009 | Abrahams | ........................ | 706/62 |
| 7,640,185 B1 * | 12/2009 | Giordano et al. | ............... | 705/23 |

(Continued)

*Primary Examiner* — Gregory Johnson
(74) *Attorney, Agent, or Firm* — Young Basile; Denise M. Glassmeyer

(57) ABSTRACT

A system and method of expedited credit approval and lending for an applicant initially pre-qualifies the applicant using an input device to obtain predetermined applicant identification information and transmits the applicant identification information to the credit and loan processor computer which verifies the applicant identification without pulling credit. If verified, applicant answers predetermined prescreen question to initially pre-qualify the applicant and the applicant's answer is compared to a predetermined lender/dealer criteria for the prescreen question to determine whether to continue with the loan application if the applicant's answer meets the predetermined lender/dealer criteria or end the loan application if the predetermined lender/dealer criteria is not met, before pulling credit. The source or transaction originator is notified of the decision. The credit and loan processor software program continues to pre-qualify the applicant using stated debt to income ratio for a selected loan type and if pre-qualified, then processes full credit.

20 Claims, 16 Drawing Sheets

(56) References Cited

U.S. PATENT DOCUMENTS

| | | | |
|---|---|---|---|
| 7,689,484 B2 * | 3/2010 | Hall et al. | 705/35 |
| 7,797,231 B1 * | 9/2010 | Loeb et al. | 705/38 |
| 7,811,172 B2 * | 10/2010 | Asher et al. | 463/42 |
| 7,827,078 B2 * | 11/2010 | King et al. | 705/28 |
| 7,966,203 B1 * | 6/2011 | Pietrzak | 705/4 |
| 8,050,961 B2 * | 11/2011 | Matsubara | 705/7.38 |
| 8,103,564 B2 * | 1/2012 | Foote | 705/35 |
| 8,489,447 B1 * | 7/2013 | Waldorf | 705/7.35 |
| 8,533,073 B2 * | 9/2013 | Eldred | 705/28 |
| 2001/0011245 A1 * | 8/2001 | Duhon | 705/38 |
| 2001/0037288 A1 * | 11/2001 | Bennett et al. | 705/38 |
| 2001/0051914 A1 * | 12/2001 | Yoon et al. | 705/38 |
| 2002/0038258 A1 * | 3/2002 | Inoue et al. | 705/26 |
| 2002/0040339 A1 * | 4/2002 | Dhar et al. | 705/38 |
| 2002/0178110 A1 * | 11/2002 | Yoshiura et al. | 705/37 |
| 2003/0078877 A1 * | 4/2003 | Beirne et al. | 705/38 |
| 2003/0078879 A1 * | 4/2003 | Ieshima et al. | 705/38 |
| 2003/0105710 A1 * | 6/2003 | Barbara et al. | 705/39 |
| 2003/0139990 A1 * | 7/2003 | Greco | 705/35 |
| 2003/0229582 A1 * | 12/2003 | Sherman et al. | 705/38 |
| 2004/0088246 A1 * | 5/2004 | Jepsen et al. | 705/38 |
| 2006/0106691 A1 * | 5/2006 | Sheaffer | 705/35 |
| 2006/0265259 A1 * | 11/2006 | Diana et al. | 705/7 |
| 2006/0282356 A1 * | 12/2006 | Andres et al. | 705/35 |
| 2006/0293979 A1 * | 12/2006 | Cash et al. | 705/34 |
| 2007/0016518 A1 * | 1/2007 | Atkinson et al. | 705/38 |
| 2007/0050201 A1 * | 3/2007 | Gardner et al. | 705/1 |
| 2007/0106584 A1 * | 5/2007 | Irwin | 705/35 |
| 2007/0112582 A1 * | 5/2007 | Fenlon | 705/1 |
| 2007/0156502 A1 * | 7/2007 | Bigvand | 705/9 |
| 2007/0244808 A1 * | 10/2007 | Eze | 705/38 |
| 2007/0250783 A1 * | 10/2007 | Wu et al. | 715/762 |
| 2007/0265960 A1 * | 11/2007 | Advani et al. | 705/38 |
| 2007/0288359 A1 * | 12/2007 | Amadio et al. | 705/38 |
| 2008/0015887 A1 * | 1/2008 | Drabek et al. | 705/1 |
| 2008/0097663 A1 * | 4/2008 | Morimoto | 701/29 |
| 2008/0243661 A1 * | 10/2008 | Bussone et al. | 705/35 |
| 2008/0243662 A1 * | 10/2008 | Subramaniam | 705/35 |
| 2009/0043680 A1 * | 2/2009 | Alliotts | 705/35 |
| 2009/0055310 A1 * | 2/2009 | Chandran et al. | 705/38 |
| 2009/0132348 A1 * | 5/2009 | Bria et al. | 705/10 |
| 2009/0177576 A1 * | 7/2009 | Cugliari | 705/38 |
| 2009/0182661 A1 * | 7/2009 | Irwin | 705/38 |
| 2009/0189736 A1 * | 7/2009 | Hayashi | 340/5.81 |
| 2009/0216591 A1 * | 8/2009 | Buerger et al. | 705/7 |
| 2010/0083147 A1 * | 4/2010 | Gaffney | 715/762 |
| 2010/0235250 A1 * | 9/2010 | Bar-Levav | 705/23 |
| 2011/0119180 A1 * | 5/2011 | Park et al. | 705/40 |
| 2011/0166988 A1 * | 7/2011 | Coulter | 705/38 |
| 2012/0233010 A1 * | 9/2012 | Frohwein et al. | 705/26.3 |
| 2013/0006809 A1 * | 1/2013 | Hollenshead et al. | 705/26.41 |
| 2013/0018813 A1 * | 1/2013 | Carroll et al. | 705/327 |

* cited by examiner

SYSTEM AND METHOD OF EXPEDITED CREDIT AND LOAN PROCESSING

CROSS-REFERENCE TO RELATED APPLICATIONS

This application claims the benefit of U.S. Ser. No. 13/625,796 filed Sep. 24, 2012, which is currently co-pending, the entire disclosure of which is incorporated herein by reference and which claims the benefit of U.S. Provisional Application No. 61/537,757 filed Sep. 22, 2011, the entire disclosure of which is incorporated herein by reference. This application also claims the benefit of PCT Application No. PCT/US 12/56949 filed Sep. 24, 2012, which is currently co-pending, the entire disclosure of which is incorporated herein by reference and which claims the benefit of U.S. Provisional Application No. 61/537,757 filed Sep. 22, 2011, the entire disclosure of which is incorporated herein by reference.

BACKGROUND

The present disclosure relates generally to credit application evaluation and loan processing, and more particularly, to an integrated method and system for expeditiously determining the credit worthiness of a borrower and processing a loan using an electronic lending platform format.

When a consumer is interested in financing a prospective purchase of a good or service based on credit, the consumer typically completes a credit application for review by a potential lender. This type of application can be referred to as a direct transaction and is as follows. In a direct loan transaction, a credit application usually requires the applicant to provide certain sensitive personal information, such as the applicant's social security number, date of birth, or the like. This information is submitted by the consumer or on the consumer's behalf by a third party who does not participate in the credit decision process for the given application and in consideration for the consumer to receive the lender(s) response directly and that the consumer will chose to apply contract with one such lender as applicable directly.

This contrasts with an indirect loan transaction in which the consumer is approved through the sales entity at which they are purchasing the goods, product or service(s) and that sales entity functions as the source indicator for financial institution(s) who will ultimately purchase the completed loan application and exchange the collateral with the selling entity subsequent to this transaction. In reality, the selling entity is the only creditor and is the decision making entity that determines whether the newly acquired asset will be resold or retained.

In an indirect sales situation, the seller may transmit the completed application to one or more lenders for evaluation. Each of the lenders, in turn, submits required credit request information to a credit-reporting agency based on the information in the completed credit application. For a fee, the credit-reporting agency generates a credit report and associated credit score and provides it to the prospective lender. The information is then transmitted from each of the potential lenders to the seller. The seller then identifies the financing options available to the applicant based on a comparison between the credit report and associated credit score and the lending criteria of various lending institutions. This process as described may or may not subscribe to industry best practices and/or comply with current and future lending requirements and regulations. Furthermore, the process as just described is cumbersome and generates unnecessary actions that can have undesired effects on the consumer and/or financing source. It would be desirable to provide a platform that would identify whether the transaction was to be a direct transaction or an indirect transaction and would allow all participants involved in the transaction process to conduct the transaction efficiently, economically and in compliance with current and/or future lending rules, regulations and requirements. It is understood that indirect transactions as that term is used herein include transactions referred to as credit sales or Retail Installment Sales that are governed by retail installment sales contracts (RSIC) It would also be desirable to provide a system and methodology that allows the participants to the transaction to increase the likelihood of successful and compliant application transaction consummation by a variety of prequalification indicators including, but not limited to, information vetting through a series of checks and balances prior to submission of a completed or near-completed application.

Conventional credit approval processes can be slow, very time consuming and often results in a significant amount of wasted effort on the part of those involved, especially if the applicant has a poor credit history. Moreover, the process can be costly for the potential lenders, and can adversely affect a consumer's credit score, such as if a credit application is denied or due to multiple "pulls" of the consumer's credit score by different potential lenders. Once the applicant is approved for the loan transaction, then other unrelated parties may be involved in structuring and finally closing the loan. In instances where the transaction involves an RSIC, unrelated parties are not involved in structuring or closing the sale and are not to be permitted access to the consumer credit information.

Thus, there is a need in the art for a faster, more efficient, more cost-effective credit application process that uniformly makes credit determinations earlier in the loan application process. Further, there is the need for an integrated system for executing the approved loan.

SUMMARY

Accordingly, a system and method of expedited direct and/or indirect application(s) is disclosed herein. The process includes the steps of input of application-relevant information using any suitable input device. The application-relevant information can include, but is not limited to, personal and non-personal information as required. The inputted application-relevant information can now be transmitted through suitable input device(s) to the platform credit sales and loan processor computer which in turn analyzes the application-relevant information against qualification parameters that are resident within the platform and may generate a minimum of one output solution based upon this parameter analysis that can be transferred in computer readable medium. This process can be implemented for both direct and indirect loan transactions.

The process also includes at least one step in which the characterization of the transaction is classified as either and indirect or direct loan transaction. This information can be inputted as part of the process. Preferably, this input/decision occurs in the initial phases of the application process. It is to be understood that, in a direct transaction as that term is employed herein, the transaction which progresses can also be characterized as a direct credit application between the applicant/consumer directly to the financial institution lender.

In an indirect transaction, the applicant's application is submitted to the seller of the goods, product or services that the applicant chooses to purchase. At this time, the seller is considered the creditor as he is the owner of the goods products or services that the applicant seeks to purchase. Therefore the seller is entity that is taking the applicant's complete application. The transaction may mature into an RSIC or a lease credit sale which the seller of the goods may choose to assign to an entity unrelated to the buyer/seller transaction distinct from the buy/sell transaction has been completed. The applicant's information is submitted to the platform disclosed herein to generate a solution that may include at least one or more consideration criteria contained within that seller's profile. The consideration criteria can be derived from a variety of sources which include but are not limited to transaction attributes provided from one or more of the various financial sources/lenders (for example consumer debt-to-income ratio, the ratio of the cost of the purchased article to the amount financed, etc.) Consideration criteria can also include information derived from and identified within the seller's underwriting profile. The generation step can include a query or queries that results in the vetting of the complete application against the identified financial source/lender(s) criteria associated within the specific seller's profile to determine the applicant's qualification.

If verified, the process continues with the applicant answering predetermined prescreen question(s) to initially pre-qualify the applicant and the applicant's answer is compared to predetermined lender/financing source criteria for the prescreen question to determine whether to continue with the application if the applicant's answer meets the predetermined lender/financing source criteria or end the loan application if the predetermined lender/financing source criteria is not met, before pulling credit. The source entity that is doing the submission is notified of the decision. The credit and loan transaction processor software program disclosed herein continues to pre-qualify the applicant using stated debt-to-income ratio for a selected loan transaction type and, if qualified, then processes the full application.

The method also includes the steps of using an automated loan transaction structuring tool associated with the platform to complete the application for either direct, indirect, lease or Buy-here pay-here (BHPH) transactions. The automated loan transaction structuring tool prompts the entity, i.e. the seller of the goods, to input predetermined information for the loan transaction type and automatically calculates loan transaction structure and notifies the entity such as seller of the goods of adjustments to comply with application predetermined rules associated with the selected loan transaction type. The software program platform sends the resulting funding package that can include all of the required forms for the loan transaction to the entity such as the seller of the goods.

The method also includes the steps of using an automated loan transaction structuring tool associated with the credit and loan processing software program to complete the application by the seller (also referred to as the source or selling entity). The automated loan structuring tool prompts the source/selling entity to input predetermined information for the loan transaction type, generates the proper application forms automatically, places or associated a disclosure specifically created for that loan transaction type with the query and automatically calculates the loan transaction structure and notifies the source/selling entity of adjustments necessary to comply with predetermined rules associated with the selected loan transaction type. The software program sends the funding package for the loan transaction to the Assignee or Potential Assignee (e.g. lender) were permitted or the assignable RISC were applicable.

A system of expedited loan transaction approval and lending is provided that includes a credit and loan transaction processing software program that is resident on a credit and loan processor computer having a server and a data storage device. The credit and loan transaction processing software obtains predetermined identification information regarding an applicant using an input device, verifies the applicant identification information and, if verified, continues to process the application. The system includes a display device in communication with the credit and loan transaction processor computer for communicating a predetermined prescreen question(s) to the applicant i.e. potential buyer to initially pre-qualify the buyer/applicant for a loan transaction. The system also includes an input device for transmitting the buyer/applicant's answer to the predetermined prescreen question(s) to the credit and loan transaction processing computer, and the credit and loan transaction processor software program compares the buyer/applicant's answer(s) to the prescreen question(s) to a predetermined lender/dealer criteria for the prescreen question(s) and communicates via the communications network whether to continue with the loan application if the buyer/applicant's answer(s) meets the predetermined lender/dealer criteria for the prescreen questions and/or end the loan transaction application if the buyer/applicant's answer does not meet the predetermined lender/dealer criteria. The predetermined prescreen question is selectively determined to initially pre-qualify the applicant for the loan transaction without consideration of the buyer/applicant's credit score and credit history. The system also includes a device in communication with the credit and loan transaction processor computer or device in a communications network, and the lender/dealer/financial source provides the credit and loan processor software program the predetermined prescreen questions. The system also includes a source device such as a computer in communication with the credit and loan processor computer via a communications network to obtain income and debt information from the buyer/applicant using the credit and loan processing software program. The credit and loan processing software program determines a debt-to-income ratio for the buyer/applicant by comparing the buyer/applicant's debt-to-income ratio to a lender's/dealer/financial source's predetermined debt-to-income ratio rule for the loan and continues the application if the lender's/dealer/financial source's predetermined debt-to-income ratio is met and ends the application if the lender's/dealer/financial source's predetermined debt-to-income ratio is not met.

An advantage of the present disclosure is that the system platform and method of expedited credit and loan transaction processing provides a faster, more time efficient, more cost-effective loan transaction application process resulting in a faster credit decision regarding the desired transaction. Another advantage is that the system and method of credit and loan transaction processing protects the privacy and interests of all of the parties involved. Still another advantage is that the system and platform and method of credit and loan transaction processing determines the loan transaction amount for which the buyer/applicant can pre-qualify for early in the process. Still yet another advantage is that the system and method of credit and loan transaction processing automatically structures the deal to comply with lender/dealer/financial source's requirements. A further advantage is that the system and method of credit and loan transaction processing limits any potential adverse effects upon a buyer/borrower's credit report if the buyer's application is denied. Still a further advantage is that the system and method of credit and loan processing creates an electronic lender/dealer/financial source that is always available and can selectively handle all facets of the lending process. Yet still a further advantage is that the system and method of credit and loan processing prescreens the potential loan candidate and makes a credit decision without having to pull a credit report from a credit agency. Yet a further advantage is that the system and method of credit and loan processing can simultaneously contract and close the deal upon lender/dealer approval.

Other features and advantages of the present disclosure will be readily appreciated, as the same becomes better understood in view of the subsequent description taken in conjunction with the accompanying drawings.

BRIEF DESCRIPTION OF THE DRAWINGS

The present invention will become more fully understood from the detailed description and the accompanying drawings, wherein:

FIGS. 3a-3m are a series of screen shots illustrating implementation of the method of expedited credit approval and lending of FIGS. 2a-2d in conjunction with the system of FIG. 1.

DESCRIPTION

Figure 1:
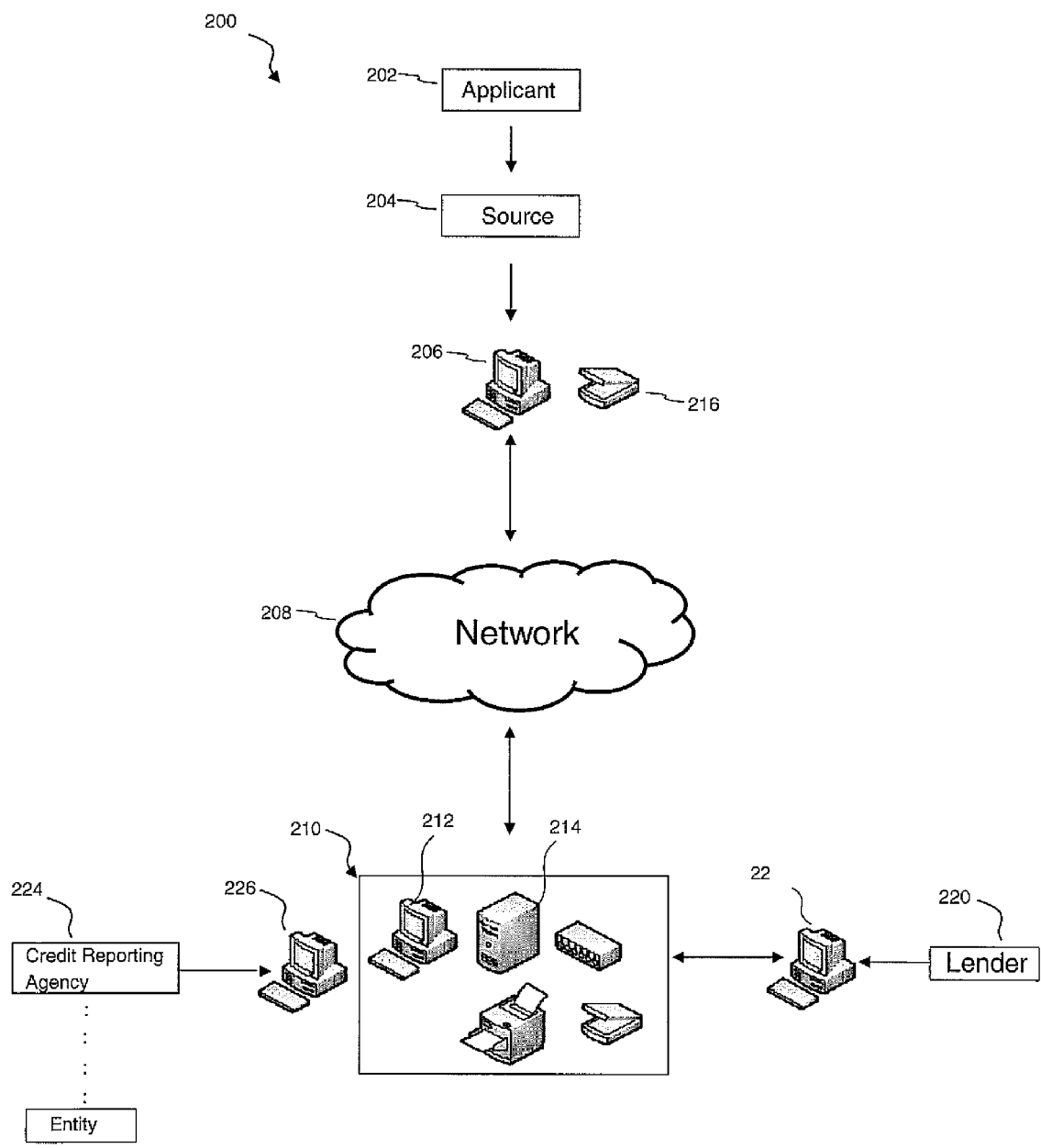
FIG. 1 is a diagram illustrating a system for expedited credit approval and lending.
Figure 2A:
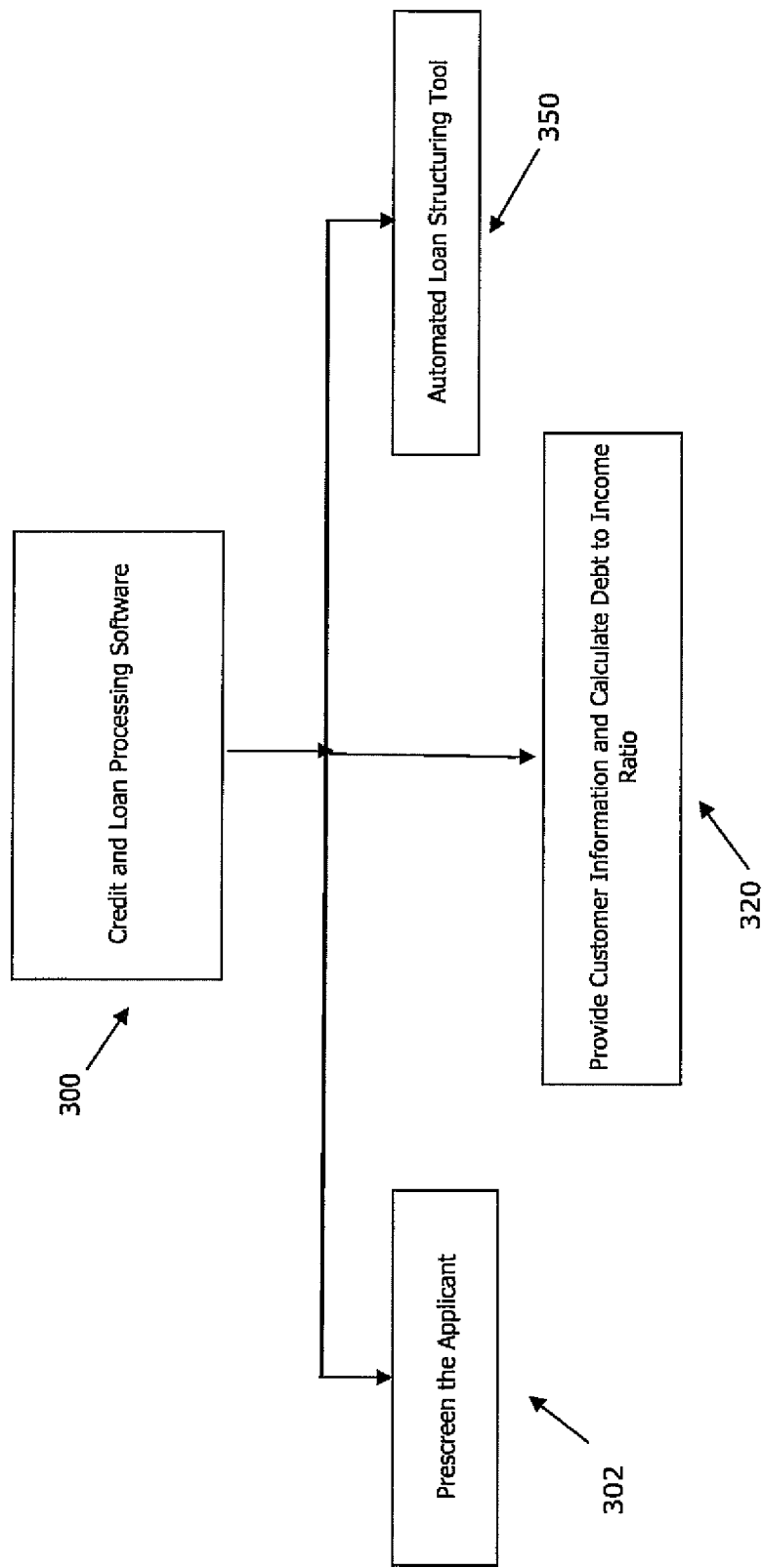
FIGS. 2a-2d are directed to a flow chart illustrating a method of credit approval and lending, using the system of FIG. 1; according to an embodiment as disclosed herein.
Figure 2B:
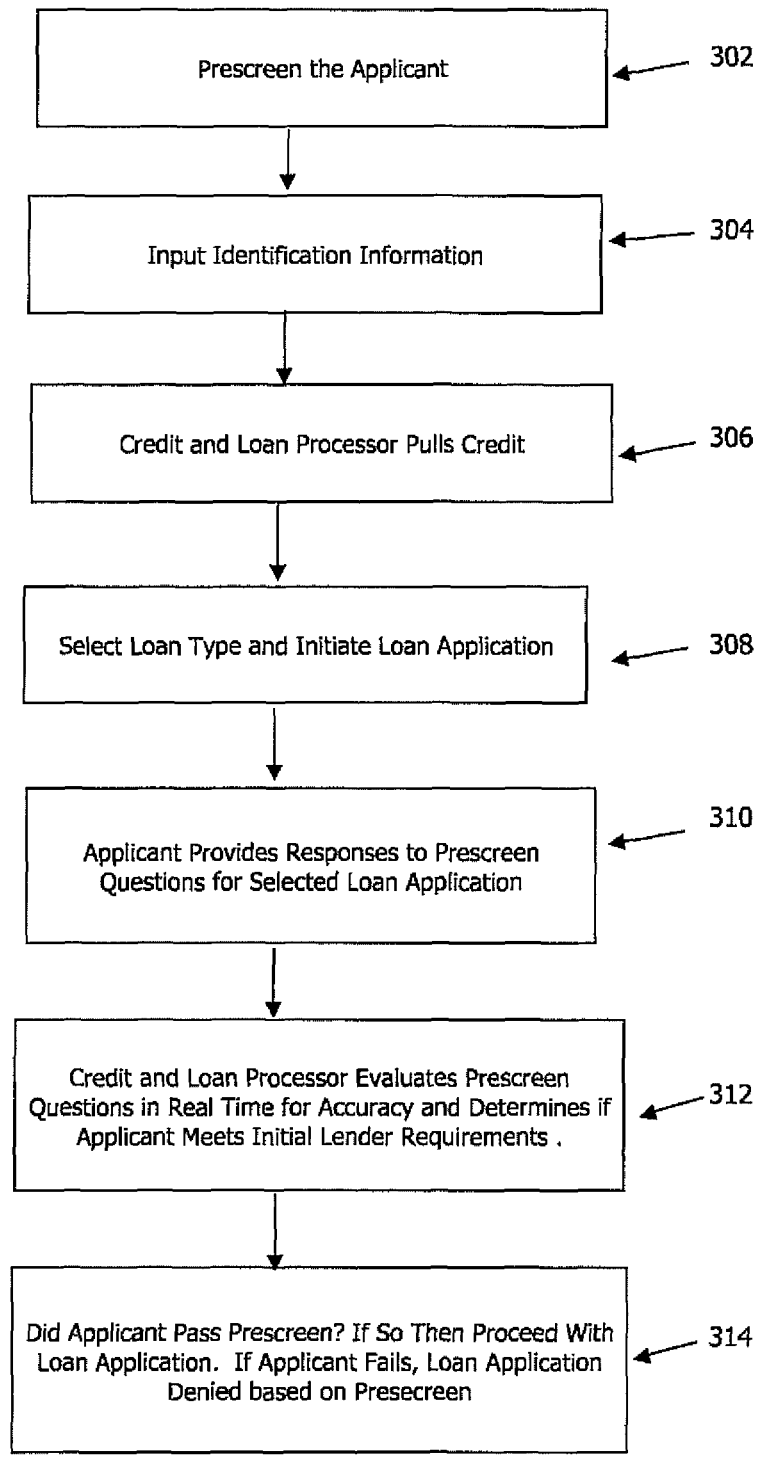
Figure 2C:
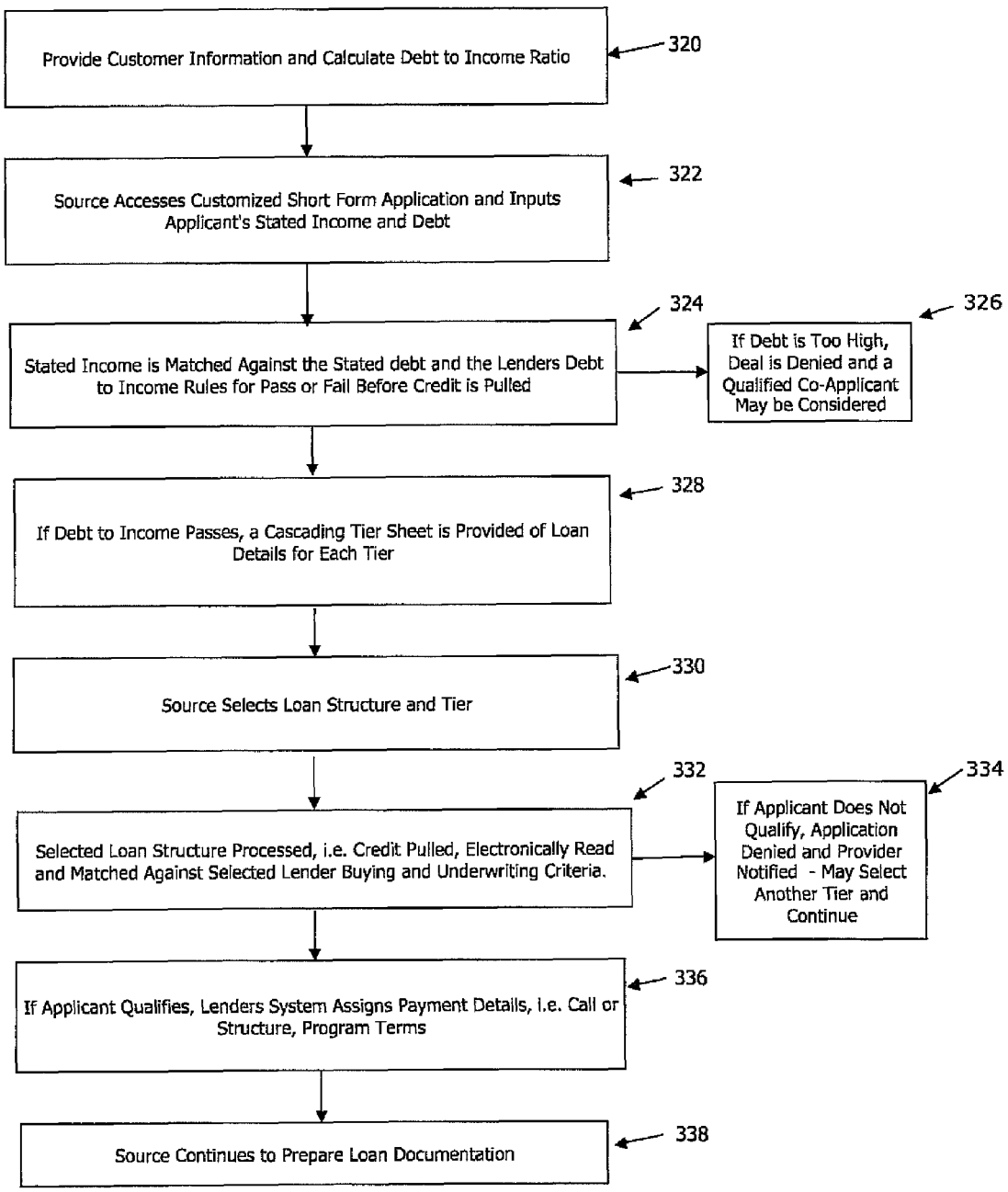
Figure 2D:
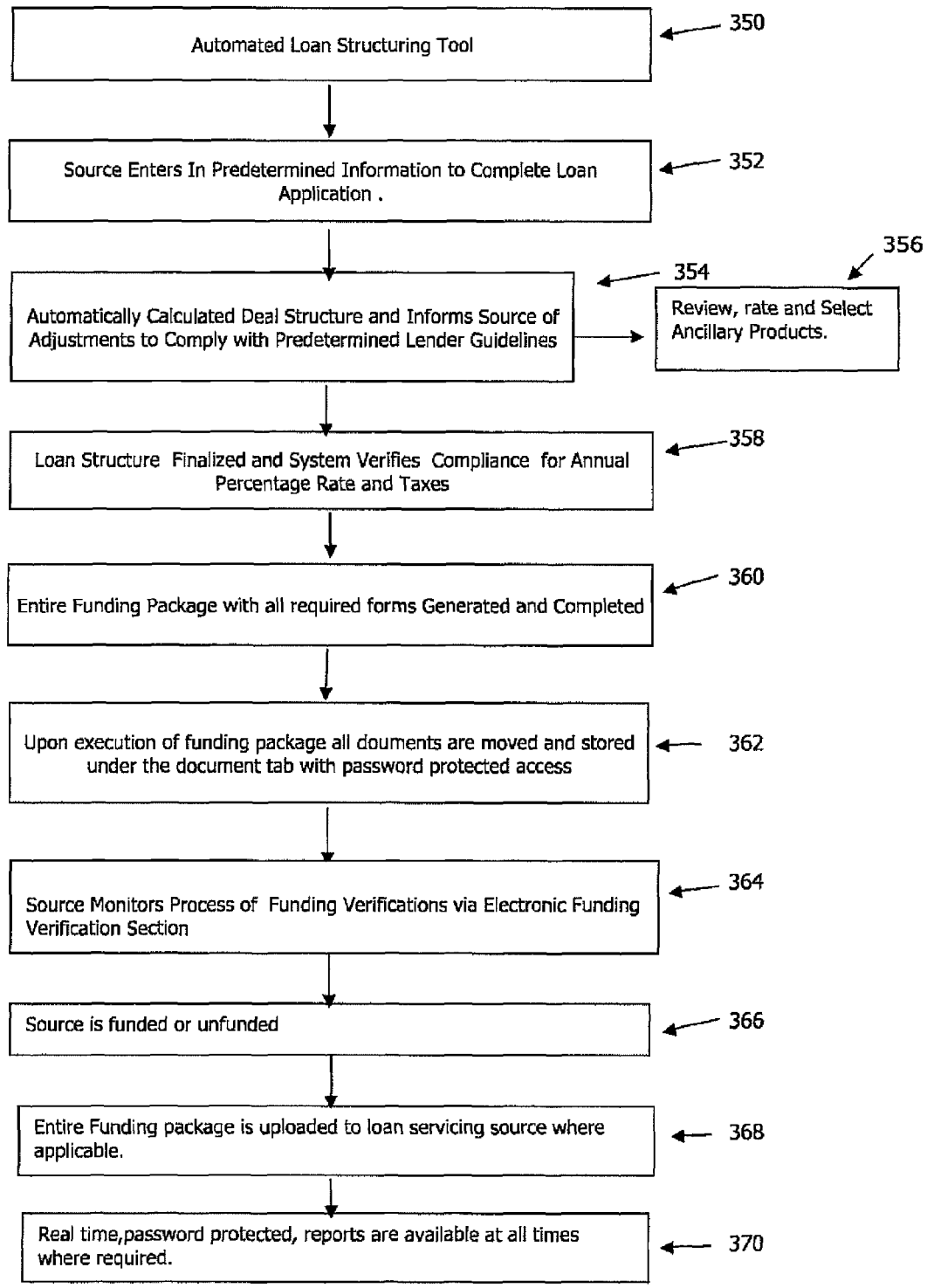

The following description of the preferred embodiment(s) is merely exemplary in nature and is in no way intended to limit the invention, its application, or uses. Referring to FIG. 1, a system for use in credit approval and lending is provided. The system 200 includes an buyer/applicant 202, such as a consumer, customer, or other entity desirous of obtaining financing or a loan transaction for some use or purpose, the reason for the loan being non-limiting. An example of a reason is the purchase of a product. The product could be a vehicle, or real property, or consumer good or the like. Another example of a reason is to pay for educational, medical or other types of expenses. The buyer/applicant 202 may have a computer. The applicant's computer has a processor, controller, a database or memory associated with the controller, an input device, output device and display device. The buyer/applicant's computer may be any type of computer device, such as a desktop, laptop, net book, smart phone, personal computer or the like. The applicant's computer may be in communication with a credit and loan transaction processing computer 212 via a communications network 208 in a manner to be described.

The system also includes a seller 204 of a good or service. In an example, the seller 204 is a seller or retail establishment, such as an auto dealer, furniture store, appliance store, or the like. In another example, the seller 204 offers a service, such as medical care, insurance, or education or the like. In a further example, the seller 204 offers a financial service, such as a bank, credit union or the like. It should be appreciated that the seller 204 and a credit and loan transaction processor 210 could be one in the same.

The system includes a seller computer 206 having a processor, controller, a database or memory associated with the controller, an input device, output device and display device. Data relevant to the transaction may be stored on the source database. The seller computer 206 may be a single computer or a series of networked computers in communication with one another. The seller computer 206 is in communication with a credit and loan processing computer 212 and other computers in the system via a communications network 208.

The input device 216 may be any type of data input device such as a keyboard, mouse, voice recognition device, optical device or the like. An example of an optical device is a scanner that optically reads an image and converts the image into digital or electrical content. Similarly, the input device may a bar code reader that reads a magnetic strip and converts the information into electrical content.

The communications network 208 may be wired or wireless, or a combination thereof. Examples of a communications network includes, a telecommunication network, a line-connected network, a wireless communication network, such as an intranet or the Internet, a local area network (LAN), wide area network (WAN), virtual private network (VPN), a digital communication network or system, a personal communication services (PCS) network or system, a satellite communication network, a broad band communication network, a radio communication network, any other communication network or system or combination thereof, and the type of communication network is non-limiting.

The credit and loan transaction processing computer 212 may be a server having a processor, controller, a database or memory associated with the server, an input device, output device and display device. Data relevant to the transaction may be stored in the database. The credit and loan transaction processing computer 212 may be one or a series of networked computers in communication with one another. The credit and loan processing transaction computer 212 can provide control over the system and may perform any of the various processing services and/or functions to be described herein. Further, the credit and loan processing transaction computer 212 can provide services for any of the other system computers, and may facilitate communications between such computers. In this manner, data and/or information transfer between any of such computers may be in a bidirectional manner.

An expedited credit and loan transaction processing software program 214 is resident on the credit and loan transaction processing computer 212. The credit and loan transaction processor 210 provides lending services to the seller 204 via a completely automated turnkey lender management platform (LMP) providing user customizable credit decision making and loan processing. Advantageously, the LMP may move a potential loan from application to maturity all within one system.

The system 200 further includes a lender/dealer/financing source 220 having the ability to loan the buyer/applicant capital, or otherwise provide funding via a loan transaction such as an RISC. The credit and loan transaction processor 210 may interact with multiple lender/financing sources 220 in structuring the loan transaction. The lender/financing source 220 likewise has a lender/financing source computer 222 associated therewith. The lender/financing source computer 222 may have a processor, controller, a database or memory associated with the controller, an input device, lender/dealer output device and display device. Data relevant to the transaction may be stored on the financing source lender/dealer database. The lender/financing source computer 222 may be a single computer or a series of networked computers in communication with one another. The lender/financing source computer 222 is in communication with the credit and loan transaction processing computer 212 and other computers in the system via a communications network, as previously described.

The credit and loan transaction processor 210 may be in communication with others entities 224 involved in the lending process via an entity computer 226, such as a credit reporting agency and associated credit reporting agency computer that compiles and reports credit scores for an individual. The entity computer 226 is similarly in communication with the other computers and such communication can be across the previously described communications network 208. The credit and loan processor 210 is flexible and can accommodate various aspects of the credit application process and parties involved, such as lenders/financing source 220, new programs and changes to existing programs and/or tiers, vendors, dealers, loan servicing, investors, or the like. The loan transaction itself can be associated with any type of retail, leasing, LHPH or BHPH transaction, and the nature of the transaction is non-limiting. Advantageously, features may be built into the platform to assist with saving the lender/dealer money from filtering the applicant with pre-screen questions to analyzing criteria such as debt to loan ratio (DTI) prior to pulling credit. New loan programs can be added and changes to existing programs and/or tiers, can be made at any time by the lender/dealer 220 or seller 204. The credit and loan processor 210 facilitates these additions and changes so they are completed within days rather than months as typical in conventional credit application process and systems.

Other features associated with the process disclosed herein may be utilized by the credit and loan transaction processor 210. These include, but are not limited to: Extended Service Contracts, Credit Life, Accident and Health, Maintenance, GAP, VSI, etc. In an example of a seller 204 that is an auto dealer, the credit and loan transaction processor 210 has the capability of importing providers that are currently signed with an organization. Alternatively, the credit and loan transaction processor 210 can facilitate in generating new sellers, i.e. dealers, for a program.

The credit and loan transaction processor 210 can provide loan servicing, i.e. back up or primary loan servicing. For example, the credit and loan transaction processor 210 can incorporate features such as taking the loan after funding, boarding the loan, facilitating consumer payments, collecting receivables, assuming compliance responsibilities, handling any claims, handling repossessions, collateral disposition, bankruptcies, consumers calls, including payoff information, or the like. The credit and loan transaction processor 210 may also maintain real access to portfolios with the ability to auto evaluate loan to value in real time.

The credit and loan transaction processor 210 may interact with other entities 224. An example of another entity is a government database such as Office of Foreign Currency Exchange (OFAC), or the post office, or a license bureau and the selection is non-limiting. An example of another entity is an investor. For example, real time portfolio valuations can be pulled if the loan is underwritten by the credit and loan processor and stored in a database associated with the credit and loan processing computer. Should a seller desire to sell all or a portion of his existing portfolio, the seller need only to choose the date range of the portfolio and click "offer for sale". The deals may be offered for bid by an investor/assignee pool with the seller's consent. The seller can have the opportunity to choose the best bid. Advantageously, the sales process is reduced as the due diligence is already done. Once the new investor purchases the portfolio and the seller has been funded, titles to the new entity are automatically transferred, where applicable. This could be done with product servicing released or retained.

In another example, the credit and loan transaction processor 210 may selectively accommodate portfolio transactions in real time, break them down into segments of credit tiers and scores, re-evaluate values on the fly and provide spreadsheets to potential buyers of the portfolio. Additionally, the credit and loan transaction processor 210 can accommodate a pool of potential investors where bids for the originator can be obtained if desired. Thus, the use of multiple platforms for originating, booking, servicing, and selling (where applicable) loan portfolios is avoided.

The credit and loan transaction processing software program 214 may include user selectable features that are implemented in a manner to be described. The user selectable features may be incorporated in modules, to enhance the flexibility of the program 214. Examples of user selectable features include: —prescreen applications, debt-to-income (DTI) calculation occurring before credit report is pulled, valuation of collateral, deal structure to fit compliance with all programs and tiers, electronic funding packages (contract forms, warranty, etc.), electronic and mirrored funding process, document storage, auto update statuses, view contract in transit, full servicing or back up servicing, portfolio sales, compliance with OFAC, Red Flag, and consumer notification letters, adverse credit action letters, text messaging and email, note section (all communication automatically stored within the deal), lender/financial source override capabilities, VIN decoder, forms Library, custom forms, reports (Look to book, dealer activity, marketing activity, loan processor performance, expired deals (auto expire in 30 days), outstanding approvals not contracted, penetration by program and tier, complete deal status and recap., etc. The credit and loan transaction processing software program 214 may also include a reports module which can provide the stored data in a user configurable format, i.e. range, back end product, etc.

Referring to FIGS. 2A through 2D, a flowchart illustrating a method of expedited credit approval and lending is shown using the system of FIG. 1. The method is implemented using a custom designed lender/dealer software program that incorporates lender/dealer-specific modules for the seller 204 or lender/financial source 220 or other entity 224. Advantageously, the modules may be programmed for complete automation. Examples of seller 204 selectable modules includes custom templates for prescreen, debt-to-income calculations, credit underwriting, or the like. Another example of a module is a security module, such as for assigning user IDs and passwords. The modules can be implemented in a user selectable manner.

Examples of customized lender/dealer/financial source-specific modules or components may pertain to the following: originations, credit, automatic decisions, automatic structure, electronic ID and signature, automatic contracting, electronic funding verifications, item valuations, full servicing or back up, portfolio sales, electronic search features to locate applicants, automatic status updates, reports including real-time reports, built-in email, text, and messaging, or the like.

The method may be utilized with any type of transaction. In a non-limiting example to be described, the transaction is a loan for the sale and purchase of a vehicle. In such an example, the applicant 202 is a vehicle buyer and the seller 204 is an automotive dealer. However, the method is applicable to any transaction for value.

Figures 3A, 3B:
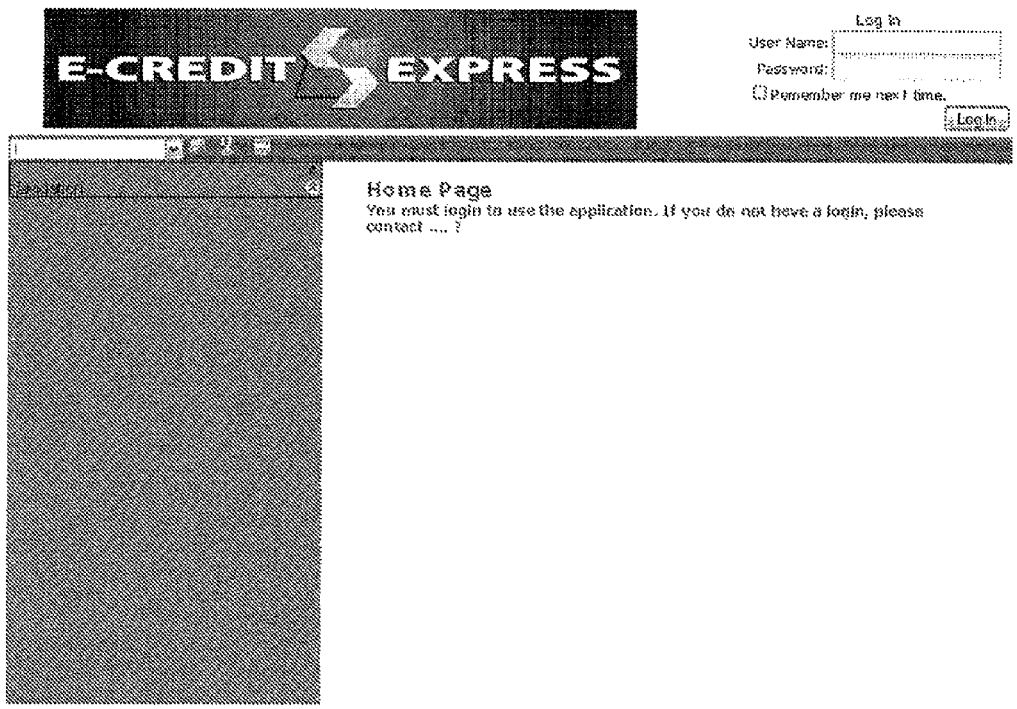

The method begins in block 300 with the step of the providing the applicant 202 access to the credit and loan transaction processing software 214. The order of steps shown is by way of example, and the steps may be varied for a particular example. Such access may be provided by the seller 204 using the seller computer device 206 as previously described. Alternatively, access may be provided directly to the applicant 202 using an applicant computer device (not shown), so that the applicant 202 is prescreened and preapproved prior to contacting the seller 204. For example, the applicant 202 or seller 204 is presented with a home page for access or log in purposes as shown in FIG. 3a. The user may be prompted to enter a User Name and password. Different users may be assigned a predetermined level of access, i.e. administrator or loan. As shown in FIG. 3b, the seller may select a Loan/Credit App tab and will be provided with a page summarizing the status of transactions. The status may change as updates are made by the credit and loan transaction processing software program 214. Advantageously, the system platform is always available and is searchable. Customized reporting may also be available. As demonstrated in FIG. 3b, different users may be assigned different levels of access, for example administrator loan applicant.

Figures 3C, 3D:
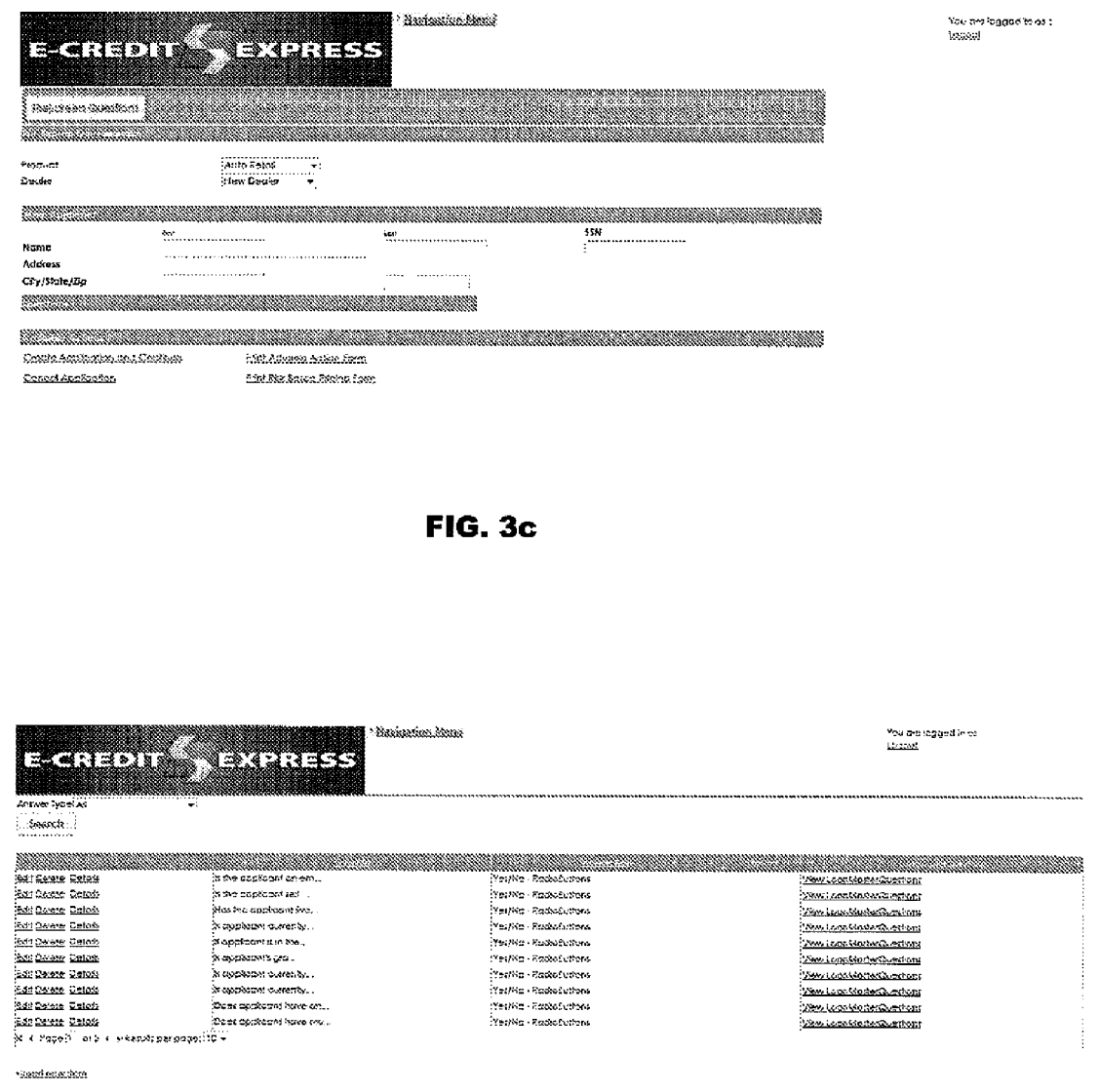

The method advances to block 302 and the prescreen of the applicant 202 is initiated. An agent of the seller 204 or the applicant 202 may initially access the credit and loan transaction processing software 214 in order to perform the prescreen. The method advances to block 304 and the applicant 202 is prescreened. As shown in FIG. 3c, the user may selectively be provided with a page and identification information pertaining to the applicant 202 and such information is provided as an input to the credit and loan transaction processing software 214. The identification information may be input automatically or manually via an input device associated with either the applicant computer device or seller computer device 206. For example, the identification information can include the applicant's name, address, date of birth, driver's license number, or other such identification number, phone number or the like. The identification information may be automatically entered such as by scanning a driver's license or identification card using an electronic data reader 216.

The method advances to block 306 and the credit and loan transaction processor may optionally perform a "soft" credit pull that is based on the provided identification information. The soft credit pull merely verifies that the identification information provided is accurate using publicly available information. It should be appreciated that the soft credit pull does not involve accessing a credit reporting agency that maintains credit reports and compiles a credit score for an individual based on their particular credit history. If the identification information is verified, the method advances to block 308 and the applicant is provided with loan types from lenders/dealers 220 relevant to the transaction and the loan application is initiated.

The methodology advances to block 310 and includes the step of selecting the loan type for the particular applicant 202. The applicant 202 may be provided with predetermined prescreen questions relevant to the loan transaction type. Referring to FIG. 3d, an example of a page such as might appear on a display screen associated with the applicant computer device or seller computer device is illustrated with prescreen questions. Examples of prescreen questions include whether the applicant 202 is employed, how long the applicant has lived at the given address, or the like. The prescreen questions may be maintained within a database associated with the credit and loan transaction processing software program 214, and the particular prescreen questions may be selected based on a particular circumstance or circumstances. By evaluating the prescreen questions early in the process, costs associated with the loan transaction process are avoided. Such filtering is done prior to pulling a credit report, for the benefit of the applicant 202 and lender/seller 204 to avoid duplicative credit inquiries.

The method advances to block 312 and includes the step of evaluating the response to the prescreen questions by the credit and loan transaction processor 210. The prescreen questions are monitored and performance tracked in real time by the credit and loan transaction processor 210. It should be appreciated that the prescreen questions may be lender/dealer specific and may be updateable. The response to the prescreen question may be sent to the lender/dealer/financing source 220 for evaluation, or evaluated by the credit and loan transaction processor 210 based on lender/dealer/financing source specific criteria. For example, the lender/dealer/financial source specific prescreen questions may have to be answered correctly in order to proceed.

The method advances to block 314 where it is determined whether the applicant 202 has passed the prescreen question(s). If the applicant 202 passed the prescreen questions, the loan application process continues. If the applicant 202 does not pass the prescreen step of block 314, then the loan application is denied based on the prescreen phase. Advantageously, the applicant 202 has been evaluated without the need to check the applicant's credit score. At this point, the applicant 202 has the option to secure a co-applicant and begin the prescreen process again. The co-applicant is prescreened in a similar manner as the applicant 202.

Figures 3E, 3F:
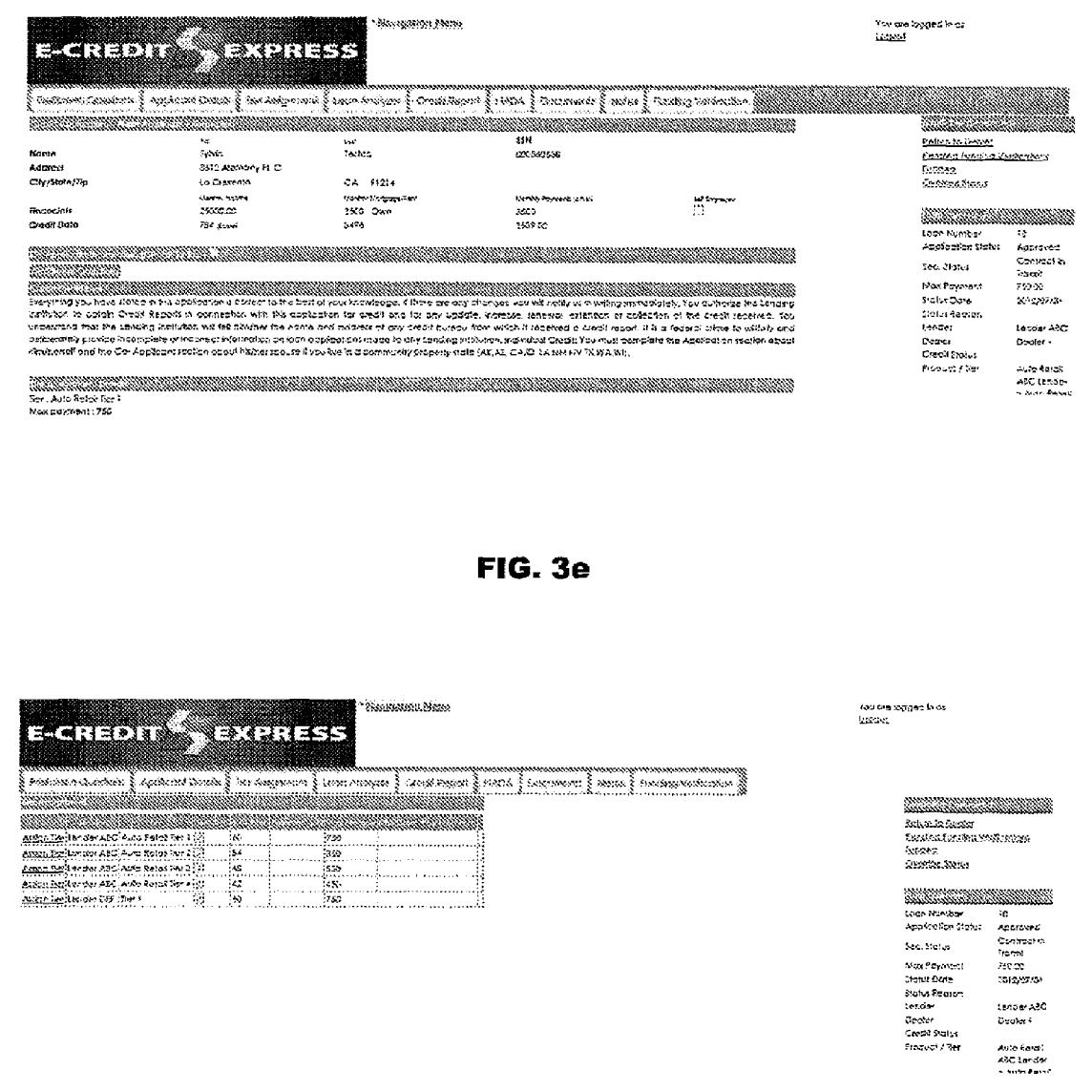

If the applicant 202 passes the prescreen step outlined at block 314, the method advances to block 320 and continues with the steps of providing additional applicant information and determining a debt to income ratio for the applicant 202. The method advances to block 322 and includes the step of the seller accessing a short form loan application that obtains information from the applicant 202 regarding the applicant's income and debt. For example, after passing the initial prescreen questions, applicant 202 or seller 204 may be provided with an applicant information screen as shown in FIG. 3e. The applicant information screen represents a customized short form application which includes entry of applicant information, such as stated gross income, monthly payments, or the like. This screen can also be configured to allow information to be entered directly from a paystub and calculated then matched against the criterion of the lender/dealer available considerations The method advances to block 324 and includes the step of the credit and loan processor 210 reviewing the applicant's stated income against the applicant's stated debt and establishing a debt to income ratio for the applicant 202. The credit and loan processor 210 than compares the applicants debt to income ratio against a particular lender's 220 predetermined debt-to-income criteria to initially determine the credit worthiness of the applicant 202. If should be appreciated credit worthiness is initially evaluated based on debt to income ratio, and that the credit report for the applicant has not yet been pulled. Since most declined transactions are due to income, the credit application is denied early and reduces cost to the lender.

If the applicant's debt to income ratio does not meet the predetermined debt to income criteria, the method advances to block 326 and the loan is denied. At this point, the applicant 202 may locate a co-applicant, and the method begins again in block 302 with the step of prescreening the applicant 202 and the co-applicant. Co-applicants may be pre-qualified using the prescreen to insure that the co-applicant is likewise pre-qualified. Alternatively, if the applicant passed the prescreen, a different loan transaction type or tier or lender/financial source may be selected and the method continues to pre-qualify the applicant.

If the applicant's debt to income ratio meets the lenders/dealer's criteria, the method advances to block 328. In block 328 the loan application continues and the seller is provided with predetermined loan information. Referring to FIG. 3f, the user may be provided with a page describing loan information, such as a Cascading Tier Sheet. The Cascading Tier Sheet includes details regarding each tier such as rate, term, fees, discounts, advances, stipulations, advance amounts, down payment requirements or the like, for a particular product. Advantageously, the seller may review the details of potential approvals to make sure that the transaction will be feasible versus just sending the file to group of lenders at one time or in a "shot gun" approach. This eliminates the need to unnecessarily pull credit reports, which is costly for the lender and could impact the applicant's credit rating. Thus, the seller 204 can establish its own underwriting guidelines if the situation warrants.

The method advances to block 330 and includes the step of the seller 204 selecting the loan structure and tier. Referring the FIG. 3f, an example of a page for selecting the tier is illustrated. If the loan is declines, the seller may select the next tier and continues.

In the example of a loan for an automotive vehicle, the seller may enter the potential Vehicle Identification Number, and the credit and loan processor may look up additional information regarding the potential vehicle from another entity and include that information in the loan application. Such information may include vehicle year, make, model, mileage or the like. The ability to auto fill information may eliminate errors due to manual data entry.

Figure 3G:
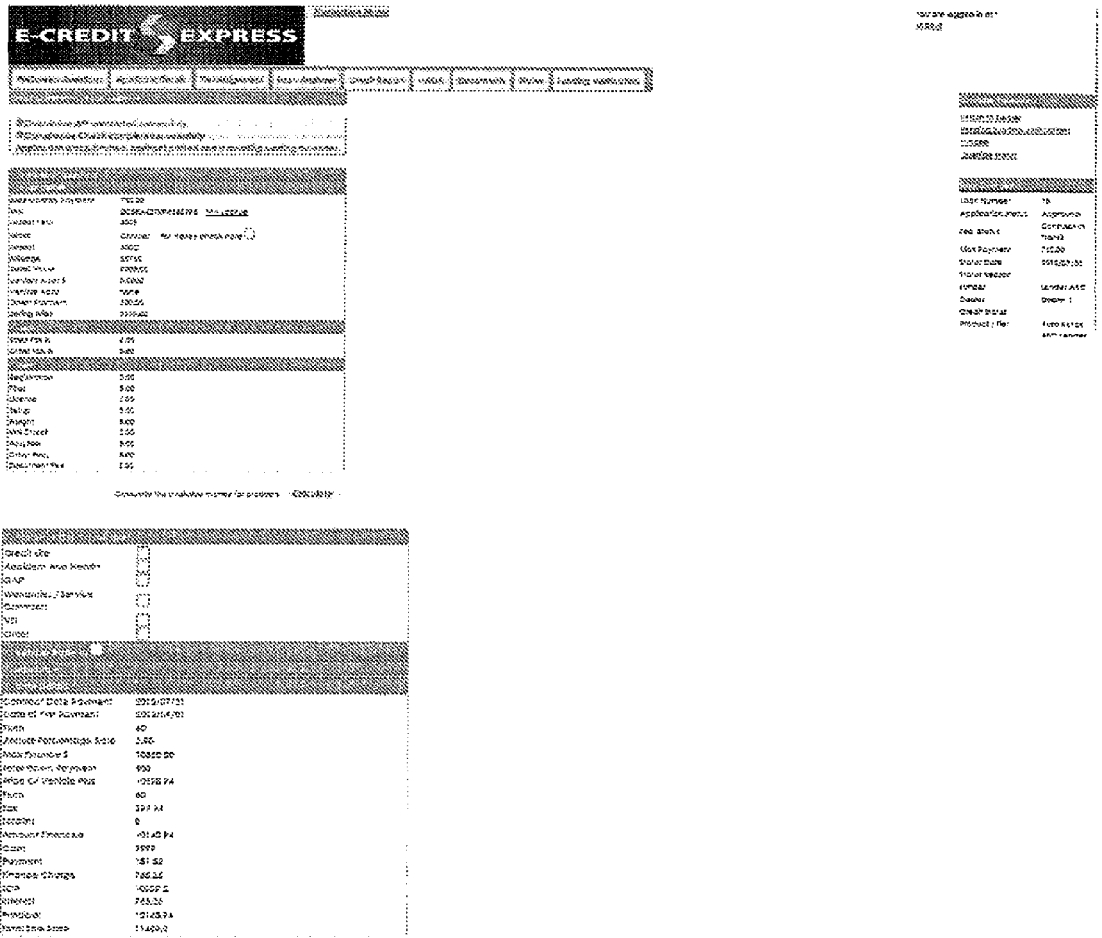

The methodology advances to block 332 and the applicant's loan transaction application is formally processed by the credit and loan transaction processor 210. Referring to FIG. 3g, an example of a page for structuring the transaction is illustrated. To process the loan, the credit and loan processor pulls the credit for the applicant. The credit history of the applicant, including credit score, may be obtained from one of the recognized credit reporting agencies, such as Transunion or Equifax or the like. The credit and loan processor 210 may evaluate the credit worthiness of the applicant 202 by matching the applicant's credit data, such as credit history, credit score, debt to income ratio or the like against a particular lenders/dealer's buying and underwriting criteria.

If determined that the applicant 202 does not qualify for the loan, the method advances to block 334 and the application is denied. The credit and loan transaction software program may automatically generate an adverse action letter for use as applicable by the seller 204. Alternatively, the seller 204 may select another loan tier for consideration. Advantageously, potentially adverse transactions are not presented to the lender, which improves the lender's "look to book".

If it is determined that the applicant 202 does qualify for the loan, the method advances to block 336 and the application is pre-approved. For example, the lender/dealer/financing source 220 may assign a payment call and/or structure along with a loan program and tier assignment. Advantageously, the credit and loan transaction processor 210 has made an initial credit decision without pulling credit from a credit reporting agency and actual credit is pulled only at the time if and when the debt-to-income passes the predetermined rules and the transaction has been accepted and purchase decision finalized. The method advances to block 338 and the seller 204 continues with preparing the pre-approved loan documentation for the particular lender/dealer/financing source 220.

The method advances to block 350 and an automated loan transaction structuring tool is implemented for structuring the transaction. The method advances to block 352 and the seller 204 enters predetermined information to complete the loan application. For example, the seller 204 may be presented with a screen on the display device for entering information. Examples of predetermined information include collateral information along with selling price of the associated article, down payment amount, tax rate (sales and use tax up front or included in monthly payments if a lease is being purchased), other related fees, or the like.

The method advances to block 354 and the credit and loan transaction processing software program automatically structures the deal. The credit and loan transaction processor may notify the seller 204 of any adjustments that may need to be made to the transaction to comply with any predetermined lender/dealer/financial source guidelines. The method may advance to block 356 and the seller may be provided with a display screen illustrating available additions to the loan transaction representing ancillary products. Examples of ancillary products include, but are not limited to, extended service agreements, insurance, warranties or the like. Any pricing, terms or other information associated with the ancillary product will be provided to the seller and applicant. If selected, such ancillary products are included with the transaction. Ancillary products and related contract forms for products may be stored and accessible through the credit and loan transaction processing software program and not called through a series of API's as is presently done.

The method advances to block 358 and includes the step of finalizing the loan transaction structure and verifying compliances with the predetermined lender/dealer guidelines and other rules such as Annual Percentage Rate and Taxes. The seller, credit and loan transaction processor or lender/dealer may perform such verification.

The method advances to block 360 after compliance is confirmed, and the step of generating the loan funding package is performed. For example, the seller 204 may select a generate contract module. At this point the applicant/buyer 202 completes a detailed credit application and other information specific to a given lender/dealer and transaction. Alternatively, the loan forms associated with the funding package can be executed in a conventional manner with the lender for funding purposes.

Figures 3H, 3I:
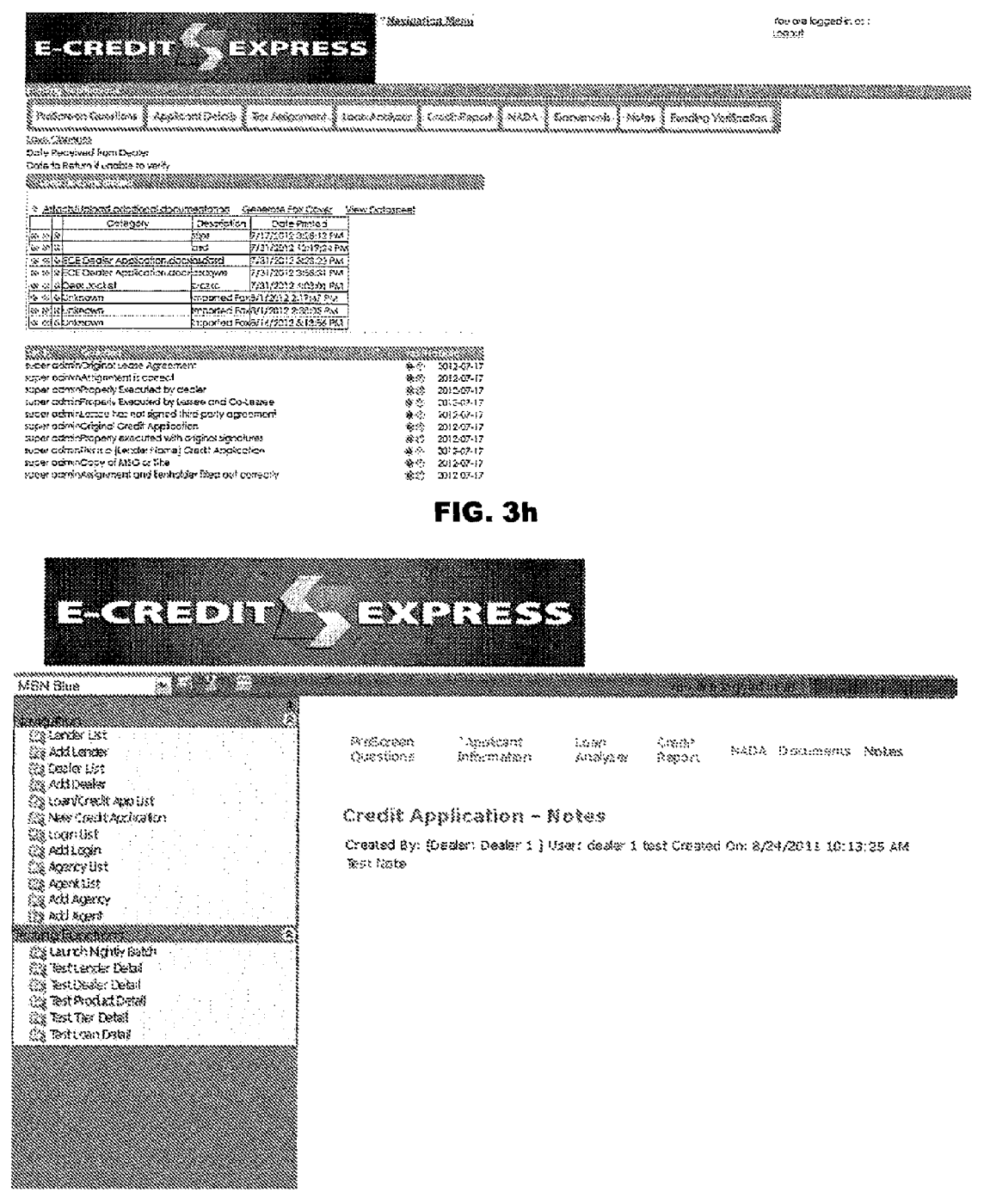

If the generate contracts module is selected, the method advances to block 362 and the loan transaction package is stored under a "Documents" tab in the credit and loan transaction processing software program 214. Access to the funding package may be password protected to offer security to the applicant, seller or lender/financing source. The seller 204 continues to process the loan transaction. The seller 204 may electronically provide additional information to the lender/financing source as necessary, and the additional information is automatically associated with the appropriate financing package for the transaction. The method advances to block 364 and includes the step of the seller 204 monitoring the process of funding the loan by accessing an electronics funding verification page maintained by the credit and loan processor 210. An example of a page illustrating electronic funding verification is illustrated in FIG. 3h. The lender may update the status of due diligence of the funding package and may provide the seller any status. The method advances to block 366 and the seller 204 is funded. If there is a problem, such as with the provided information, the seller may not be funded, but may send the transaction to another lender/financial source. The method may advance to block 368 and include the step of uploading the funding/credit sale package to a loan servicing entity or financing source. The method advances to block 370 and the transaction is complete.

Figures 3J, 3K:
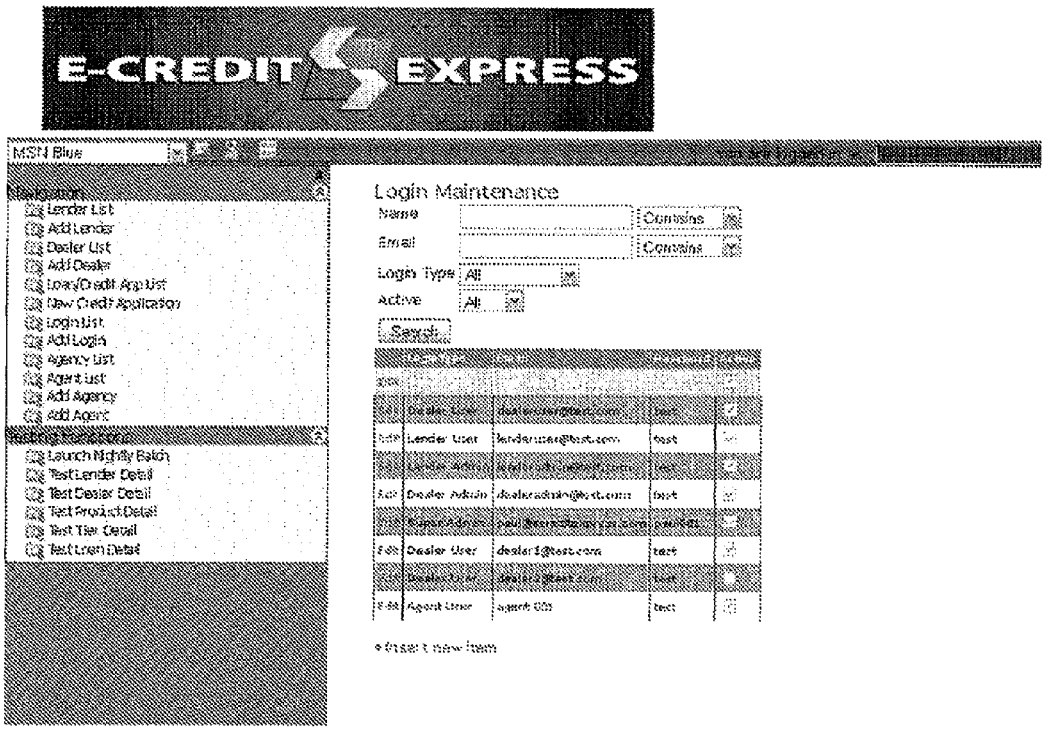
Figure 3L:
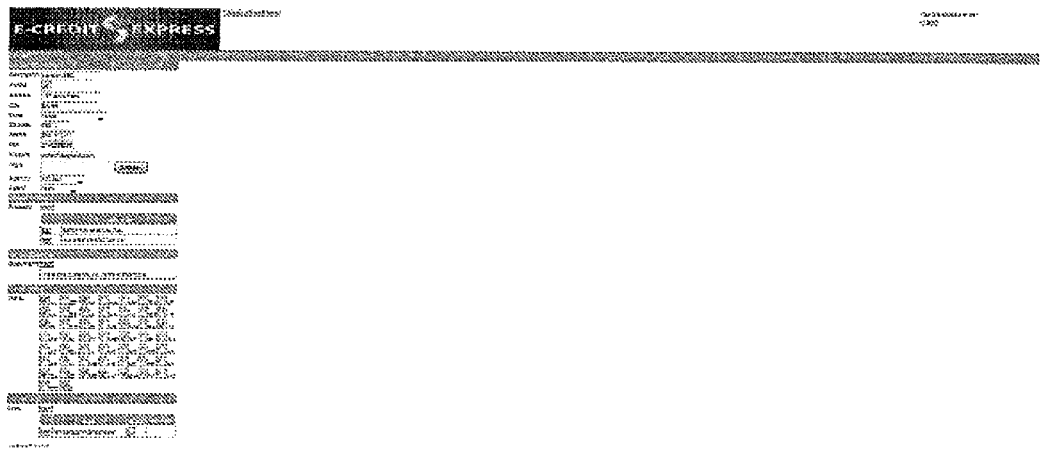
Figure 3M:

The credit and loan transaction processing software program may provide additional features, such as an electronic signature for all documents. The loan transaction paperwork may be maintained in an electronic file associated with the transaction. Reports may be available at any time. It is contemplated that the particular steps described with respect to the method may be implemented in another order. Referring to FIG. 3i, a page illustrating a notes section is provided. The notes section allows for two-way communication between the seller, credit and loan processor and lender/financing source. The notes are maintained with the electronic file associated with the transaction. Referring to FIG. 3j, a page illustrating an example of administrative functions is illustrated. The seller 204 may control who has access to the credit and loan transaction software program. Referring to FIG. 3k, a page illustrating an example of adding products or tiers is illustrated. The financial source/potential assignee may have several products or tiers that they are willing to consider for possible purchase. The credit and loan transaction processor may change products according to a particular need, such as customize for a particular state. Referring to FIG. 3l, a page is illustrated demonstrating how the credit and loan transaction processor may add lenders, adjust tiers, insert pre-screen questions or documents that are specific to a type of transaction. Further, ancillary products and advance amounts for each may be added. Referring to FIG. 3m, a page illustrating a database for credit decision rules resides within the credit and loan software program. Credit decision rules are maintained for a particular lender/dealer and are applied in analyzing a particular transaction.

The system and method of the present innovation can be utilized in numerous preferred embodiments in order to provide a vast array of financial and financial-related services for any one or more of the various parties or entities described herein. While the embodiments may be described with regards to utilization by a particular party or entity, it is important to note that any of the parties and/or entities described herein may utilize the present innovation in the same, similar and/or analogous manner.

In an alternate embodiment, referring to FIGS. 3A through 3D, there is disclosed a flowchart illustrating herein an expedited direct and/or indirect application approval or pre-qualification and processing related to purchase of goods, services or programs. The method is implemented using a custom designed lender software program that incorporates lender/dealer/financing source-specific modules for the seller 404 or lender 420 or other entity 424. Advantageously, the modules may be programmed for complete automation. Examples of seller 404 selectable modules includes custom templates for prescreen, debt-to-income calculations, credit underwriting, or the like. Another example of a module is a security module, such as for assigning user IDs and passwords.

Examples of customized lender/dealer/financing source-specific modules or components may pertain to the following: originations, credit, automatic decisions, automatic structure, electronic ID and signature, automatic contracting, electronic funding verifications, item valuations, full servicing or back up, portfolio sales, electronic search features to locate applicants, automatic status updates, reports including real-time reports, built-in email, text, and messaging, or the like.

The method may be utilized with any type of transaction. In a non-limiting example to be described, the transaction is a loan for the sale of a vehicle. In such an example, the applicant 402 is a vehicle buyer and the seller 404 is an automotive dealer. However, the method is applicable to any transaction for value.

The modules can be implemented in a user selectable manner. The method includes various steps such as providing at least one processing software program resident on a credit and loan transaction processor computer having a server and a data storage device, the processing software program having or accessing at least one seller-selected consideration criterion. As used herein, the term "consideration criterion" is defined as at least one factor a lender/dealer or lending institution identifies as relevant to ultimate awarding of a consumer loan. Non-limiting examples of consideration criteria include debt-to-income ratio, payment-to income, deal structure, loan-to-value and the like.

The method also includes the step of populating predetermined applicant identification information fields resident in the software with application-relevant information using an input device and transmitting the application-relevant information to the credit and loan processor computer. The population step can occur by any suitable manner as by manual input by either the seller or applicant as described previously.

Once the applicant identification fields resident in the processing software program have been properly populated, the application-relevant information can be verified by the processing software program. Where desired or required, the processing software can be configured to provide output identifying improperly populated identification fields and allowing the program to be restarted once the input has been correctly entered. The processing software program can be configured to generate at least one verification result command. The verification result command can be one of either a computer-generated verification signal or a computer generated non-verification signal. Where desired or required, the non-verification signal can be accompanied by computer generated diagnostics instructing and/or identifying population deficiencies so that the input can be corrected.

Upon receipt of confirmation of computer-generated verification, the application-relevant information can be analyzed against pre-qualification parameters that are either resident in the processing software program or can be accessed by the aforementioned program. In the embodiment depicted, the qualification parameters can include at least one of the following various pre-screen questions as determined by the financing source/lender or the seller/dealer. The results of the analysis can be translated into at least one output solution that can be employed in formulating the transaction solution.

The method disclosed herein can also include the step of classifying the inputted transaction data as either a direct or indirect transaction. The classification step can be accomplished by any suitable means. In the embodiment depicted in FIG. 4, classification is accomplished by seller input through the suitable communication device. In certain embodiments, input can be accomplished by using a suitable user prompt such as a radio button on an output screen. It is also within the purview of this disclosure that the classification step can be accomplished in whole or in part by interrogation of the inputted material to determine the nature of the transaction being devised.

In situations where the classification is a direct transaction the program triggers a series of steps that result in the creation of a direct credit application between an application who wishes to buy given goods, products or services. As used herein, non-limiting examples of products, goods and services that can durable goods such as moving vehicles (cars, trucks, off-road vehicles, maritime vehicles, air craft—both private and commercial), fixed appliances (household appliances, commercial apparatus etc. both commercial and private), various products including but not limited to extended warranties, etc.

In situations where the transaction is classified as an indirect transaction such as a credit sale, such classification can result in at least one command step that characterizes the seller/dealer as the creditor for purposes of the transaction. The method or process disclosed herein includes additional steps such as processing applicant/buyer-relevant information against one or more seller-selected consideration criteria resident in or accessible to the processing software program and generating at least one output solution and based on the generated output solution, ultimately generating at least one applicant-related document.

The applicant/buyer-relevant information can include various identification data such as name, address etc. In the process disclosed herein, applicant-relevant information also may include at least one factor that can impact loan repayment risk assessment. Non-limiting examples of applicant-relevant information include data such as applicant income, debt obligations etc. This information can be applicant/buyer-provided and even applicant/buyer inputted if desired or required. The applicant/buyer-relevant information can consist in whole or in part of material or information that is derived from various inputted data, directly or algorithmically. The inputted data can be supplied variously by the applicant or other sources. The program can include additional steps of input verification as desired or required. Input verification can be accomplished by presentation of indicia such as paycheck stubs and the like. The program can include steps and modules for input and population of facsimiles of such documents. Alternately, the program can include suitable commands to prompt the seller to input affirmation to suitable inspection queries.

"Consideration criteria" as that term is used can be defined as one or more factors relevant to the ultimate successful consummation of a transaction between the seller/dealer and the lender/potential assignees. These consideration criteria can include, but are not limited to, at least one of debt-to-income ratio for the relevant purchaser, loan-to-value ratio for the asset to be purchased. It is to be understood that consideration criteria can be one or more of the following: information provided or derived from specific lender/financing source requirements of potential assignees, information derived from seller underwriting requirements, as well as other sources. The consideration criteria can populate a decision library.

The processing program and method disclosed herein can be employed to produce at least one output solution which, at minimum is based upon a comparison and analysis of the applicant-relevant information with the consideration criteria. In specific embodiments of the method and program disclosed herein, the program can have modules to facilitate seller selection of lender/dealer consideration criterion. Thus the program is configured to allow the seller to select considerations to associate with. This can be accomplished by any suitable means. Seller selection commands prompt the program to access lender/dealer populated data to assemble a seller-specific consideration criteria to which the applicant-relevant information can be evaluated to generate the output solution. The output solution may include one or more lender packages associated with a given lender or lenders who would consider the terms of the proposed applicant-seller transaction. It is to be understood that in certain situations, there will be no lenders who find the proposed transaction acceptable. In such situations, the seller/dealer may take one or more of actions at the seller's discretion including but not limited to: terminating the sales process, querying lenders outside the initial seller-selected lender pool, and/or reconfiguring the transaction to increase likelihood of successful outcome. It is within the purview of this disclosure that the program and method disclosed herein can include and access suitable solution outcomes to suggest modifications to the proposed transaction that might increase likelihood of successful outcome.

It is to be understood that verification may be accomplished by other pathways in certain embodiments of the invention disclosed.

Figure 4A:
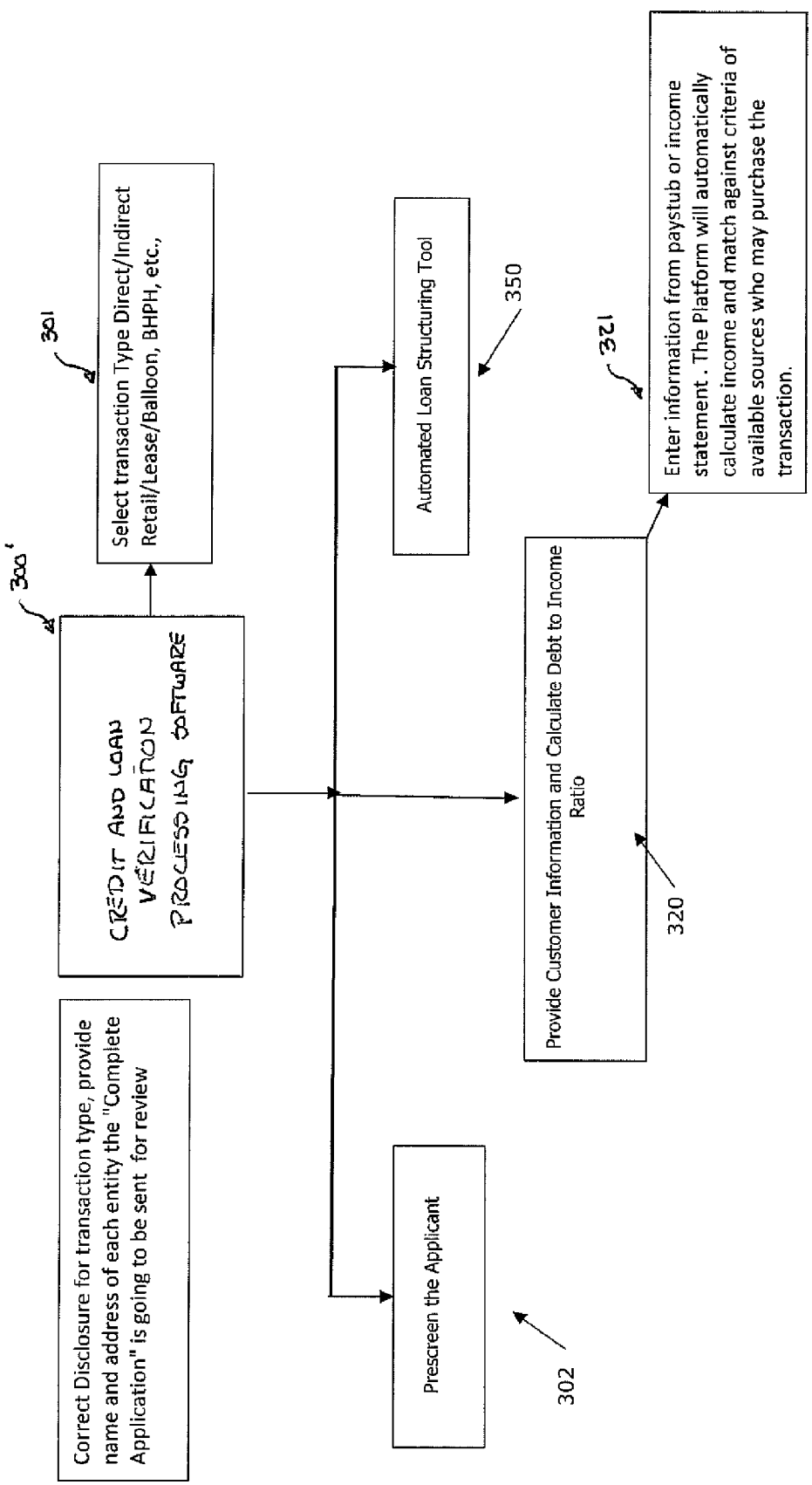
FIGS. 4a-4d are directed to a flow chart illustrating a method of credit approval and lending, using the system of FIG. 1; according to an alternate embodiment as disclosed herein.
Figure 4B:
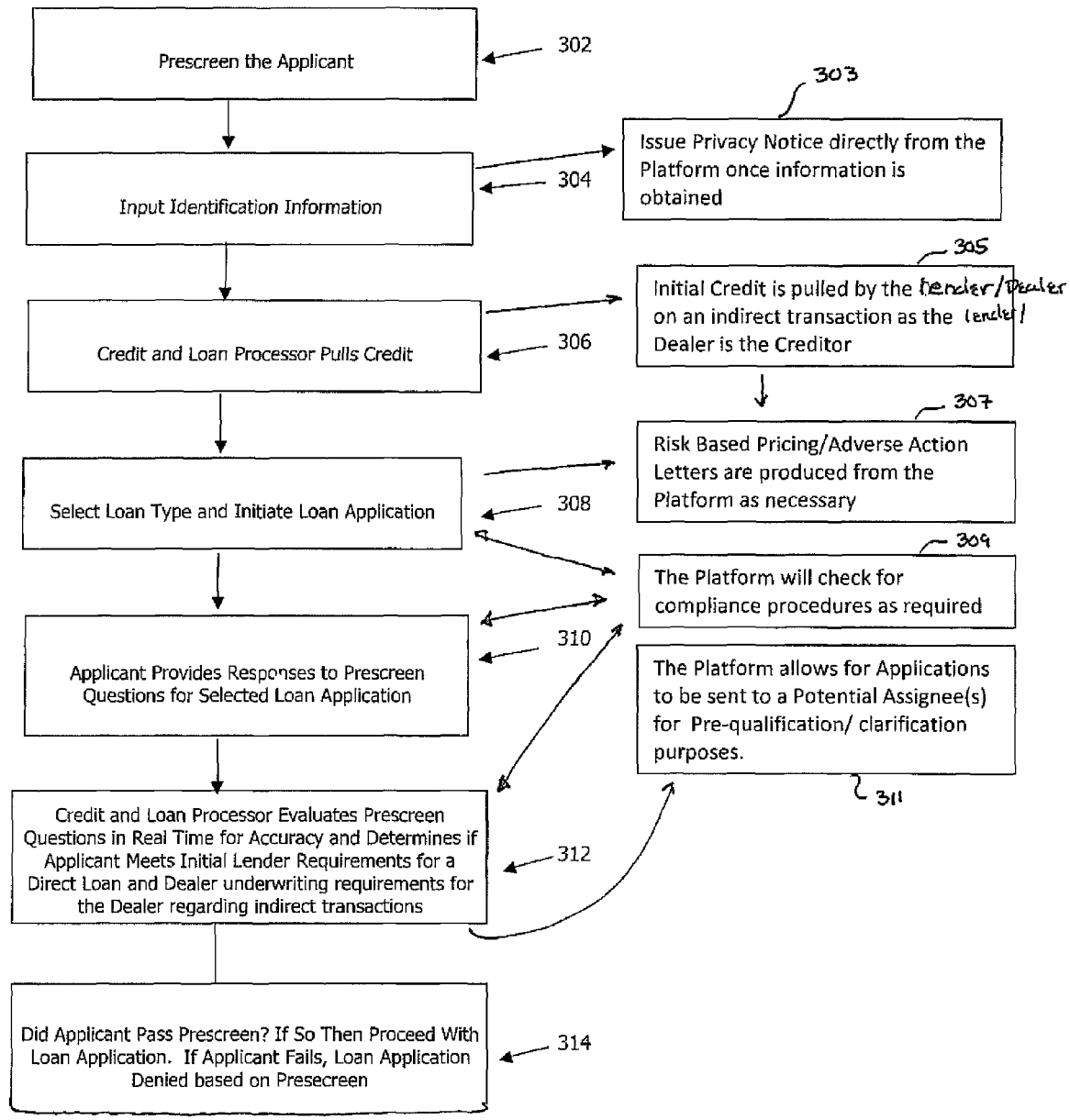
Figure 4C:
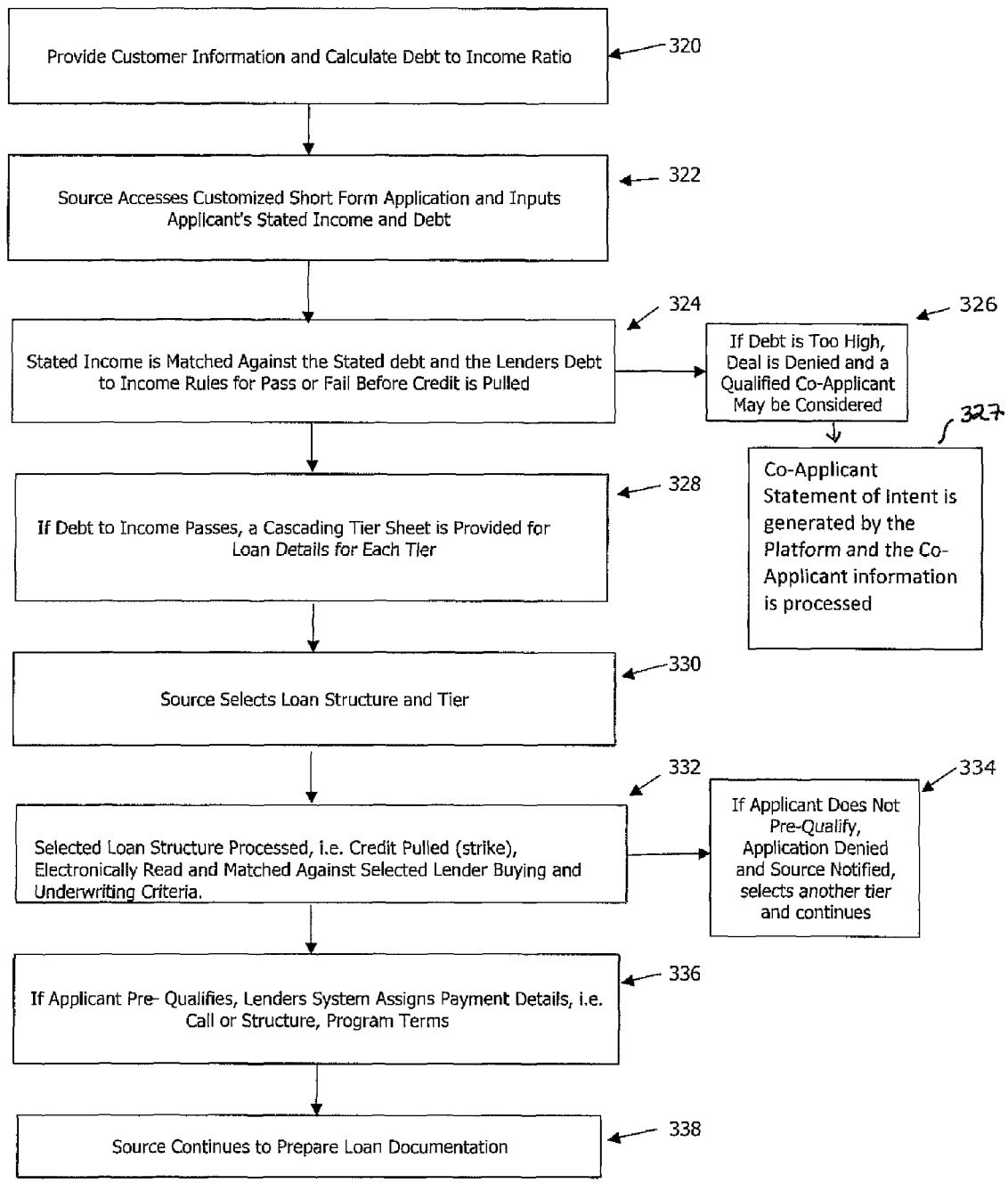
Figure 4D:
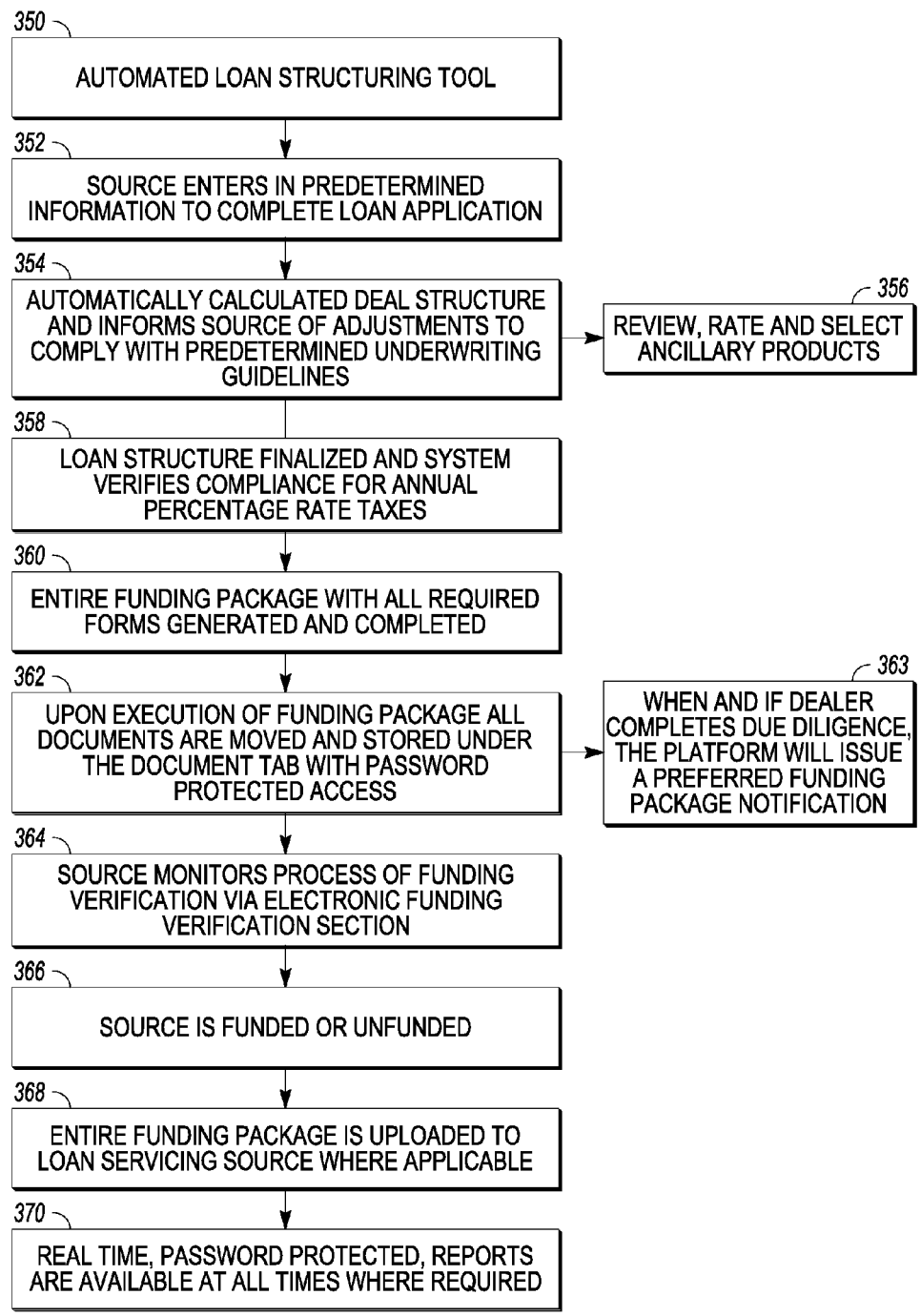

It is contemplated that, in certain embodiments, the program and process modules employed for dealing with an indirect transaction may be similar to the process described previously in conjunction with FIG. 2. Referring now to FIG. 4a, distinctions and elements relevant to the indirect loan transaction programming and processing embodiment will be discussed. In the process and program configured to process indirect loans, the program will include a step module at reference numeral 301 which permits selection or determination of the transaction type. In addition to the direct and indirect transactions that have been described previously, other transaction types can be designated. Non-limiting examples of such types are retail transactions, lease transactions, balloon loans, BHPH type loans etc. The program and process that is outlined in FIG. 2a steps like those at reference number 312 are directed to direct loan transactions and can be bypassed in indirect loan transactions. It is contemplated that the privacy and other pertinent notices may still be delivered to applicants through the system.

In indirect loan transactions such as credit sales transactions, the process and program can be configured to populate, issue and maintain privacy and appropriate privacy notices directly from the platform once the information about the applicant is obtained as at reference numeral 303. Where desired or required, the privacy notice can also include the necessary consents to pull the applicant's credit history. The program can trigger generation of an initial applicant credit report on behalf of the seller. The credit report can be used together with any applicant-relevant information that has been gathered by the seller to characterize the risks associated with the potential transaction and to identify one or more lenders who would be available and willing to consider the assumption of this potential debt obligation proposed between the applicant and the seller upon completion of due diligence and internal underwriting. At any time that the inputted information produces an adverse risk conclusion, the process and program can generate informational document(s) that can include communications such as risk/based pricing/adverse action letters as at reference numeral 307. The platform and process can be configured to assess for compliance procedures as necessary or required as at reference numeral 309.

The platform and process as described and disclosed herein provides a method and process that allows consumer applications and potential transactions to be verified and evaluated by lenders/assignees who may be interested in obtaining the debt obligation in a manner that eliminates the need for the those lenders/assignees having to go to the expense and effort of pulling credit reports for multiple low-value potential buyer/applicants and underwriting transactions they may not receive from a seller due to shot gunning application process. It is also contemplated that the program and method disclosed herein can be configured so as to provide the seller/dealer and financial source/lender with a degree of confidence that a transaction or transactions can be underwritten or transferred at a rates and risk levels suitable to the parties involved. Furthermore, where desired or required, the program and platform can be configured to provide communication channels between the lender and the seller/dealer to provide clarification on classes of transactions or on individual transactions themselves and can update the basic program to implement the additional learnings derived from the clarifications.

Many modifications and variations of the present disclosure are possible in light of the above teachings. Therefore, within the scope of the appended claim, the present disclosure may be practiced other than as described. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of expedited direct or indirect application approval and processing related to purchase of goods, services or programs, the method comprising the steps of:
   (a) providing at least one processing software program resident on a credit sale and loan processor computer having a server and a data storage device, the processing software program having or accessing at least one seller-selected consideration criterion wherein the seller has possession of at least one collateralizable article;
   (b) populating predetermined identification information fields resident in the software with application-relevant information associated with a prospective individual purchaser of the collateralizable article under the control of a seller using an input device and transmitting the application relevant information to the credit sale and loan processor computer, wherein the application-relevant information also includes data regarding the collateralizable article;
   (c) verifying the application-relevant information by the credit sale and loan processing software and generating at least one verification result command, the verification result command being one of either a computer-generated verification signal or a computer generated nonverification signal;
   (d) upon receipt of a computer-generated verification indication, analyzing the application-relevant information against qualification parameters resident in the at least one software program and generating at least one output solution, wherein the output solution is one associated with a concluded credit sale transaction that is assignable by the seller to a financial institution.

2. The method of claim 1 further comprising the step of: classifying the inputted transaction data as either a direct or indirect transaction, wherein the classification step includes at least one user input action, the user input action executed by the seller of the collaterizable article.

3. The method of claim 2 wherein classification as a direct transaction results in creation of a direct credit application between the prospective individual purchaser and the seller of at least one collateralizable article.

4. The method of claim 2 wherein classification as an indirect transaction results in at least one command step characterizing seller as creditor and wherein the method further comprises the step of:
   processing application-relevant information against one or more seller-selected consideration criteria resident in or accessible to the processing software program and generating at least one output solution; and
   based on the at least one output solution, generating at least one item of applicant-related documentation.

5. The method of claim 1 wherein the verifying step further comprises the following steps:
   if the verifying step generates a positive verification indication, issuing a computer generated continuation command operable to initiate at least one sequentially subsequent process step;
   if the verifying step generates a negative verification indication (or), issuing at least one correction request command.

6. The method of claim 5 wherein the verifying step further comprises the step of re-verifying input resulting from the correction request command(s), wherein if the re-verifying step generates a positive verification command, issuing a computer-generated continuation command operable to initiate at least one sequentially subsequent process step.

7. The method of claim 1 further comprising the steps of:
   (a) providing a source computer that is in communication with the credit sale and loan processor computer;
   (b) obtaining income and debt information from application-relevant information using the processing software program;
   (c) determining a debt-to-income ratio based on application-relevant information using the processing software program;
   (d) performing at least one program driven analysis of the determined debt-to-income ratio against at least one consideration criterion selected the seller, wherein the seller-selected consideration criterion is relevant to debt-to-income ratio such that favorable comparison prompts continuation of the program and unfavorable comparison triggers at least one notification signal to be transmitted to the seller, wherein the seller-selected criterion includes data originating from at least one third-party financial institution, and wherein the at least one third-party financial institution seeks assignment of the resulting credit sale transaction;
   (e) generating a list of tier categories and communicating the generated list to the seller, wherein selection of one listed tier category triggers continuation of the processing program and at least one computer-generated command to obtain the prospective individual purchaser's credit report from a credit reporting agency in communication with the credit sale and loan processor computer;
   (f) analyzing the obtained credit report against the at least one consideration criterion criteria for the selected credit sale and loan tier category generated by the processing software program and generating at least one communication message to the seller; and
   (g) prompting the seller for at least one approval input upon indication of acceptable credit report criteria and denying the credit sale or loan to the prospective individual purchaser if the predetermined criteria for the selected credit sale or loan tier is not met and communicating whether the credit sale or loan is pre-approved or denied to the source prospective purchaser via the communications network.

8. The method of claim 1 further comprising the steps of: using the consideration criteria to initially pre-qualify a co-applicant using the credit sale and loan processing software program.

9. The method of claim 8 further comprising the steps of: selecting another credit sale or loan category if the credit sale or loan to the potential purchaser for the initial selected assignable credit sale or loan category is denied using the processing software program.

10. The method of claim 8 further comprising the steps of: using an automated credit sale or loan structuring tool associated with the processing software program to evaluate feasibility and complete the assignable credit sale or transaction, wherein the automated credit sale or loan structuring tool:
    (a) prompts the seller to input predetermined information for the credit sale or loan type;

(b) automatically structures the credit sale transaction and notifies the seller of adjustments to comply with applicable rules associated with the selected credit sale transaction; and (c) sends a funding package for the credit sale to the seller from the credit sale and processor via the communications network, the funding package including at least one executable document.

11. The method of claim 10 further comprising the step of providing the seller with access to a status of the credit sale or loan application using the credit sale and loan transaction processing software program.

12. The method of claim 1 wherein the seller is a vehicle dealer and collateralizable article a vehicle.

13. The method of claim 1 wherein the potential purchaser identification information is obtained using electronic means and transmitted to the processor computer.

14. The method of claim 1 wherein the seller-selected consideration criterion is derived from qualification criterion of the seller and/or one or more lending institutions and the qualification criterion is queried to identify at least one transaction category for which the prospective individual purchaser pre-qualifies without consideration of the prospective individual buyer's credit score and credit history.

15. The method of claim 14 wherein the application-relevant information includes at least one of: debt-to-income ratio, customer statement, co-applicant information, wherein the application-relevant information is determined without consideration of the prospective purchaser's credit score and credit history.

16. A system of expedited credit sale approval and lending, the system comprising:
a processing software program resident on at least one credit sale and loan processor computer, the credit sale and loan processor computer having a server and a data storage device, wherein the credit sale and loan processing software program obtains predetermined application-relevant identification information using an input device, wherein the application-relevant information is associated with a prospective individual purchaser of a collateralizable article under the control of a seller, and wherein the input device verifies the application-relevant information and, if verified, continues to process the credit sale application;
a display device in communication with the credit sale and loan processor computer for communicating at least one query to the seller;
an input device for transmitting the application-relevant information to the credit sale and loan processing computer, wherein the processing software program compares the application relevant information against at least one seller-selected consideration criteria to produce at least one output solution, wherein the seller-selected information includes value of at least one collaterizable article;
wherein the processing software program implements a method of expedited direct or indirect application approval and processing related to purchase of goods, services or programs that includes the steps of:
(a) providing at least one processing software program resident on a credit sale and loan processor computer having a server and a data storage device, the processing software program having or accessing at least one seller-selected consideration criterion wherein the seller has possession of at least one collateralizable article;

(b) populating predetermined identification information fields resident in the software with application-relevant information associated with a prospective individual purchaser of the collateralizable article under the control of a seller using an input device and transmitting the application-relevant information to the credit sale and loan processor computer, wherein the application relevant information also includes data regarding the collateralizable article;

(c) verifying the application-relevant information by the credit sale and loan processing software and generating at least one verification result command, the verification result command being one of either a computer-generated verification signal or a computer generated nonverification signal; and (d) upon receipt of a computer-generated verification indication, analyzing the application-relevant information against qualification parameters resident in the at least one software program and generating at least one output solution, wherein the output solution is one associated with a concluded credit sale transaction that is assignable by the seller to a financial institution.

17. The system as set forth in claim 16 further comprising: a lender computer in communication with the credit sale and loan processor computer via a communications network, wherein the lender provides the credit sale and loan processor software program with consideration criteria, independent of transaction between the seller and the prospective purchaser.

18. The system as set forth in claim 17 further comprising:
a seller computer in communication with the credit sale and loan processor computer via a communications network to obtain income and debt information from the prospective purchaser of the collateralizable article under the control of the seller using the processing software program, and wherein the processing software program determines a debt-to-income ratio for the prospective buyer by comparing the prospective buyer's debt-to-income ratio to a debt-to-income ratio rule for the associated transaction, wherein the debt-to-income ratio rule is derived from consideration criteria provided by at least one of the following: the seller and/or the lender, and wherein the software processing program continues the process if the derived debt-to-income ratio is met and ends the process if the derived debt-to-income ratio is not met; and
wherein the lender computer provides the credit sale and loan computer with at least one additional consideration criterion, the additional consideration criterion including at least one of credit sale or loan categories available to the seller, deal structure, collateral requirement;
wherein upon receiving indication that the consideration criterion are met, the processing software program obtains the prospective purchaser's credit report from a credit reporting agency in communication with the processor software computer and ascertains whether the prospective purchaser's credit report is consistent with the previously employed consideration criteria and identifies one or more qualifying transaction categories to the seller, wherein the ascertainment process and identification process proceeds independent of lender interaction.

19. The system of claim 18 wherein the seller is a vehicle dealer and the collateralizable article is a vehicle.

20. The process of claim 1 wherein the software program is present in a computer readable medium.

* * * * *